(12) United States Patent
    Pfister

(10) Patent No.: US 11,458,527 B2
(45) Date of Patent: Oct. 4, 2022

(54) COILING DEVICE

(71) Applicant: Dennis M. Pfister, Cayucos, CA (US)

(72) Inventor: Dennis M. Pfister, Cayucos, CA (US)

( * ) Notice: Subject to any disclaimer, the term of this patent is extended or adjusted under 35 U.S.C. 154(b) by 0 days.

(21) Appl. No.: 17/334,765

(22) Filed: May 30, 2021

(65) Prior Publication Data
    US 2021/0283677 A1      Sep. 16, 2021

Related U.S. Application Data

(63) Continuation of application No. 16/073,763, filed as application No. PCT/US2017/015193 on Jan. 26, 2017, now Pat. No. 11,040,391.

(60) Provisional application No. 62/289,142, filed on Jan. 29, 2016, provisional application No. 62/363,651, filed on Jul. 18, 2016.

(51) Int. Cl.
    *B21F 3/00*      (2006.01)
    *B21F 3/04*      (2006.01)
    *H04R 1/10*      (2006.01)
    *F16F 1/02*      (2006.01)

(52) U.S. Cl.
    CPC .............. *B21F 3/04* (2013.01); *F16F 1/025* (2013.01); *H04R 1/1033* (2013.01); *H04R 2460/17* (2013.01)

(58) Field of Classification Search
    CPC ... H04R 1/1033; H04R 2460/17; B21F 3/027; B21F 3/04; F16F 1/025; B08B 9/00; B29C 53/58; B29C 53/583; B29C 53/588; B29C 53/602; B29C 53/64; B29C 53/66; B29C 53/70
    See application file for complete search history.

(56) References Cited

U.S. PATENT DOCUMENTS

| | | | | |
|---|---|---|---|---|
| 3,769,127 A | * | 10/1973 | Goldsworthy | B65H 81/08 156/203 |
| 4,175,992 A | * | 11/1979 | Grawey | B32B 25/10 156/149 |
| 4,618,764 A | * | 10/1986 | Harmer | G01M 11/085 73/705 |
| 4,716,556 A | * | 12/1987 | Raskin | B06B 1/08 367/169 |
| 5,176,625 A | * | 1/1993 | Brisson | A61M 25/0041 604/9 |
| 5,792,401 A | * | 8/1998 | Burnham | A61M 25/0012 264/103 |
| 6,479,752 B1 | * | 11/2002 | Neuroth | E21B 23/01 174/106 R |
| 10,354,781 B2 | * | 7/2019 | Hess | H01B 1/026 |
| 10,912,569 B2 | * | 2/2021 | Andrews | A61B 17/1214 |
| 2007/0299464 A1 | * | 12/2007 | Cruise | A61B 17/12168 128/831 |
| 2010/0104126 A1 | * | 4/2010 | Greene | H04R 1/1033 381/384 |

(Continued)

*Primary Examiner* — Emmanuel M Marcelo
(74) *Attorney, Agent, or Firm* — Henry C. Query, Jr.

(57) ABSTRACT

A method for making a device for coiling an elongated flexible object into a predefined shape includes the steps of winding a length of wire around an elongated first mandrel having a diameter approximately the same as a diameter of the object, winding the first mandrel, with the wire wound thereon, around a second mandrel which is configured to conform to the predefined shape, and heating the first and second mandrels to set the windings.

6 Claims, 23 Drawing Sheets

(56) References Cited

U.S. PATENT DOCUMENTS

| | | | |
|---|---|---|---|
| 2011/0308835 A1* | 12/2011 | Piekny | H02G 11/02 174/69 |
| 2012/0241195 A1* | 9/2012 | Doll | B65H 75/36 174/135 |
| 2012/0308184 A1* | 12/2012 | Pina | G02B 6/4465 385/102 |
| 2013/0148839 A1* | 6/2013 | Stevinson | H04R 1/1033 381/384 |
| 2016/0223283 A1* | 8/2016 | Brooker | F41A 29/02 |
| 2016/0223284 A1* | 8/2016 | Brooker | F41A 29/02 |

* cited by examiner

COILING DEVICE

This application is a continuation of U.S. patent application Ser. No. 16/073,763 filed on Jul. 27, 2018, which is a U.S. national stage filing of International Patent Application No. PCT/US2017/015193 filed on Jan. 26, 2017, which is based on and claims priority from U.S. Provisional Patent Application No. 62/289,142 filed on Jan. 29, 2016 and U.S. Provisional Patent Application No. 62/363,651 filed on Jul. 18, 2016.

BACKGROUND OF THE INVENTION

The present invention is directed to a coiling device for coiling elongated flexible objects, such as cables, cords, tubing and the like. More particularly, the present invention is directed to a device for maintaining cables, cords, tubing and the like in a coiled state when not in use while allowing them to be extended with minimal force to substantially their full length when in use.

The modern world is full of electrical and electronic cables that provide numerous interconnection functions. Typically, the cables provide a connection between electrical devices or between an electrical device and a person. The same connection generalization can also be used to describe tubing, the difference being that tubing provides conduits for fluids instead of electrons and typically connects pneumatic or hydraulic devices.

A common problem with cabling and tubing is "tangling", "knotting" or "twisting". Tangles, etc. are application dependent and can occur with a single length of cable or tubing or when multiple cables or tubes are intertwined. A tangled or disorganized situation can exist in either a dynamic or a static implementation. The impacts of tangling can range from frustration and nuisance to completely impeding the design operability of the device or devices to which the cables or tubes are connected.

Many techniques have been developed to manage or overcome this problem. Coiling the cable or tube is one answer. This is accomplished by integrating a coiled spring with the cable or tube at the time of manufacturing to create a self-coiling spiral assembly. This solution is often deployed when the cable or tube is used in dynamic situations, that is, when the distance between the endpoints of the cable or tube changes dynamically over time instead of remaining fixed. This approach requires a very high level of customization that is both expensive and requires that the final application be well known and anticipated in advance. Most cabling and tubing installations are highly tailored and customized at the time of installation. The level of planning to anticipate every cable or tube application would be prohibitively excessive and expensive and make this method of cable and tube management prohibitive.

A further disadvantage of this method is that traditional coiled cable and tubing will still tangle and/or fatally kink if stretched beyond the yield point of their integral springs. This means that the cable or tube cannot be pulled to its fullest possible extension or it will become permanently misshapen and distorted and possibly tangled. To prevent yielding, the spring component of the assembly must function in its engineered operational range, which requires that the cable or tube must never be fully extended but instead must always be at least partially coiled to maintain its as-manufactured condition. Consequently, a longer wire must be used to accomplish any connection. This adds cost and weight to the cable or tubing. The extra weight can be problematic in situations where the added force may unduly strain the connection points between which the cable or tube is suspended.

However, the most limiting shortcoming of the traditional coiling approach is that the technique cannot be applied to existing cables or tubing.

SUMMARY OF THE INVENTION

In accordance with one embodiment of the present invention, a device is provided for coiling an elongated flexible object into a predefined shape. The device comprises a length of wire which is formed with a minor winding and a major winding, the minor winding having an axis corresponding to the longitudinal axis of the object and being configured to conform to the cross section of the object, and the major winding being configured to conform to the predefined shape; wherein in use the minor winding secures the device to the object and the major winding coils the object into the predefined shape.

In accordance with one aspect, the minor winding is configured to be wound around an outer surface of the object.

In accordance with a further aspect of this embodiment, the wire may be made of a super elastic material. For example, the device may be made of Nitinol. Alternatively, the wire may be made of a plastic material.

In accordance with yet another aspect of the invention, the device comprises first and second ends and the minor winding comprises a first pitch which extends substantially between the first and second ends and a second pitch which is located adjacent each of the first and second ends, and the first pitch is larger than the second pitch. The minor winding may also comprise a third pitch which is located between the first and second ends, and the third pitch is smaller than the first pitch.

In accordance with a further aspect of this embodiment, the wire may be made of a super elastic material. For example, the device may be made of Nitinol. Alternatively, the wire may be made of a plastic material.

In accordance with another aspect of the invention, the device may also comprise first and second end pieces, each of which is attached to a corresponding end of the wire. For example, each end piece may comprise a ball.

In accordance with a further aspect, the device may comprise first and second clip members which are each configured to secure a corresponding end of the wire to the object.

In accordance with yet another embodiment of the invention, the object comprises a tubular member and the device is configured to extend through the tubular member. In this embodiment, the minor winding may comprise a diameter which is substantially the same as an inner diameter of the tubular member.

In accordance with a further aspect of this embodiment, the wire may be made of a super elastic material. For example, the device may be made of Nitinol. Alternatively, the wire may be made of a plastic material.

The present invention also provides a method for making a device for coiling an elongated flexible object into a predefined shape. The method comprises winding a wire around an elongated first mandrel which comprises a diameter approximately the same as a diameter of the object, the wire being would with a first pitch; winding the first mandrel, with the wire wound thereon, around a second mandrel which is configured to conform to the predefined shape; and heating the first and second mandrels to set the windings.

In accordance with an aspect of this embodiment, the step of winding the wire around the first mandrel comprises winding the first and second ends of the wire with a second pitch which is smaller than the first pitch.

Thus, the coiling device of the present invention comprises a single length of "springy" material which has been wound with at least two distinct coiled windings, a major winding and a minor winding. The minor winding is used to attach the coiling device to the cable or tube. It is therefore wound to match the cross sectional configuration of the cable or tube (e.g., rectangular, circular, etc.). For example, when applied to the outside of the cable or tube, the minor winding is sized to enable the coiling device to slightly grip the cable or tube for the application length of interest. The pitch, or lead, of the minor winding is determined by the application and is sized to adequately hold the cable or tube with the minimum amount of material. The pitch and diameter of the minor winding at the ends of the coiling device may be made smaller than the pitch and diameter of the rest of the coiling device in order to assist in locking the device onto the cable or tube.

The coiling of the minor winding forms the major winding of the device. The major winding determines the final shape which will be imparted to the cable or tube. The material used to form the coiling device and the diameter of the major winding will determine the overall spring rate which the coiling device will impart to the cable or tube.

The coiling device of the present invention provides a simple yet effective means for maintaining cables and tubing in a compact coiled configuration. The cable or tubing does not need to be disconnected prior to installing the coiling device. The coiling device can be permanently or temporarily added to the cable or tubing. The number of loops of the major winding, and the shape of the loops, can be tailored for particular applications. In addition, the coiling device can be designed to have various spring rates and spring characteristics depending on the requirements of specific applications. This allows precise management of the amount of force the coiling device will impart on the cable or tubing connections. Moreover, more than one coiling device can be used with a cable or tube, and the coiling devices can have different coil diameters and/or spring rates if required.

The major winding does not have to be uniform over the length of the coiling device. It may vary in diameter, pitch or shape depending on the needs of a particular application or certain esthetic requirements. The major winding can be square, rectangular, oval, etc., or have a random shape. In certain applications the coiling device can be a decorative as well as functional. The coiling device can also be coated, plated, colored or decorated to provide mechanical and aesthetic features to the device.

These and other objects and advantages of the present invention will be made apparent from the following detailed description with reference to the accompanying drawings. In the drawings, the same reference numbers are used to denote similar components in the various embodiments.

DETAILED DESCRIPTION OF THE INVENTION

The present invention is directed to a device which automatically coils an elongated flexible object into a predefined configuration for ease of storage and transportation. The coiling device may be used with any elongated object which has a length that is substantially greater than its diameter or width and which is sufficiently flexible to be coiled. Examples of such objects include cables, cords, tubes, ropes, wires, lines, leashes, etc. For purposes of brevity, however, the invention will be described in conjunction with an electrical cable, and in particular an earphone cable.

Figure 1:
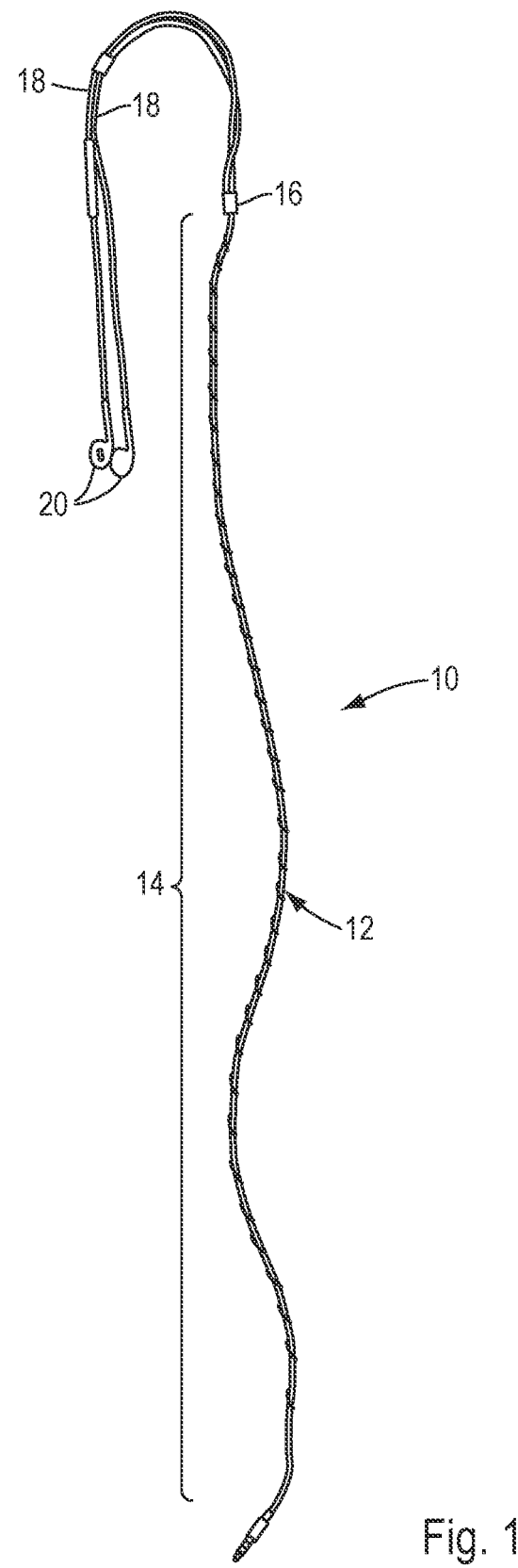
FIG. 1 is a view of one embodiment of the cable coiling device of the present invention shown in conjunction with an exemplary earphone cable and with the cable coiling device in an uncoiled state.

Referring to FIG. 1, an illustrative embodiment of the coiling device of the present invention, which is indicated generally by reference number 10, is shown installed on an exemplary earphone cable, generally 12. The earphone cable 12 comprises a main section 14 that divides at a point 16 into two branch sections 18 which each terminate in a corresponding earphone 20. In this embodiment, the coiling device 10 is configured to be installed on only the main section 14. In other embodiments, a coiling device may be configured to be installed on both the main section 14 and both branch sections 18. Alternatively, one coiling device may be configured to be installed on the main section 14 and two additional coiling devices may be configured to be installed on each of the branch sections 18. In another embodiment, one coiling device may be configured to be installed on the main section 14 and one of the branch sections 18, and a second coiling device may be configured to be installed on the other branch section. Other variations are also possible.

Figure 2:
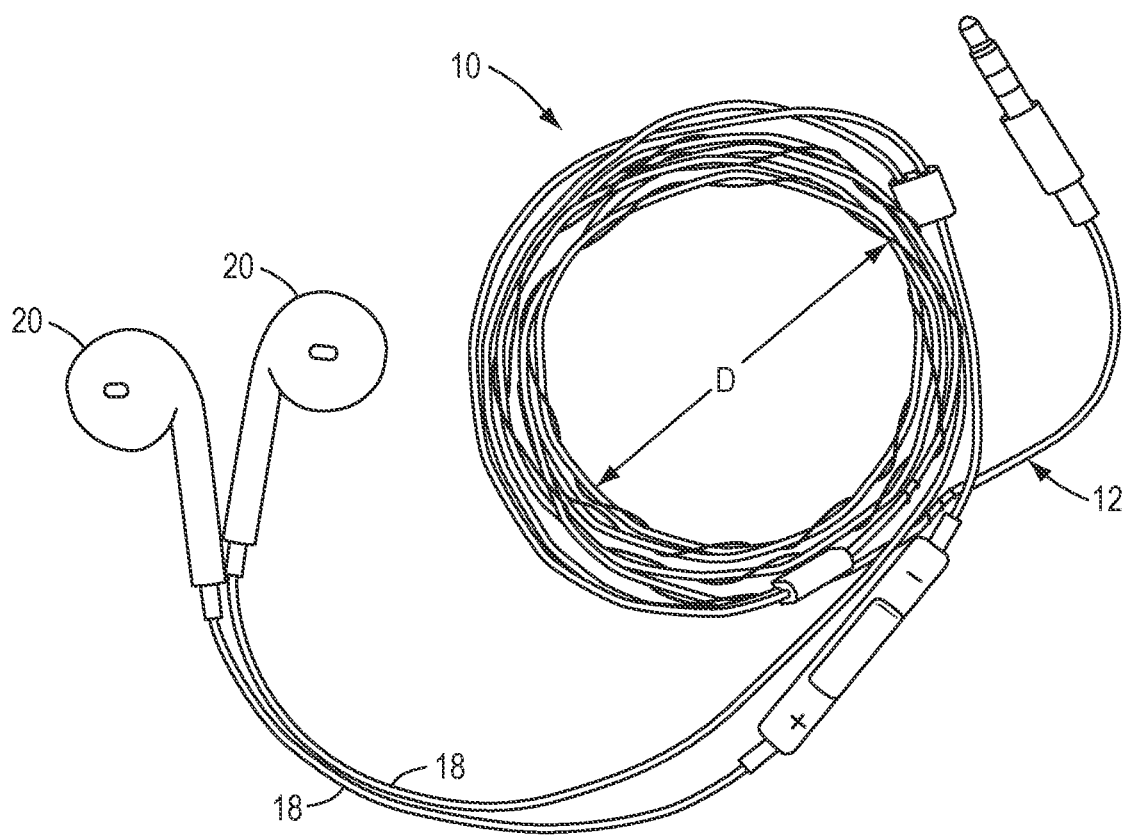
FIG. 2 is a view of the cable coiling device of FIG. 1 shown in a fully coiled state.

As depicted in FIG. 1, the cable 12 has been tensioned somewhat to show the coiling device 10 in a substantially unwound condition. In practice, the coiling device 10 is ideally designed to have a spring force which is sufficient to restore the cable 12 to a predefined coiled configuration when not in use but allow the cable 12 to extend to substantially its full length when in use. As shown in FIG. 2, for example, in the present embodiment the predefined coiled configuration is a circle. Thus, in the absence of a force tending to straighten the cable 12, the coiling device 10 will coil the main section 14 of the cable into a circle having an approximate diameter D, which as will be discussed below corresponds to the major diameter of the coiling device.

Referring to FIGS. 3-8, the coiling device 10 in accordance with an illustrative embodiment of the invention comprises a length of wire 22 which is formed with two windings: a major winding 24 which serves to coil the cable 12 into a desired configuration, and a minor winding 26 which functions both to secure the wire to the cable so that the coiling force generated by the major winding is transmitted to the cable, and to supplement the coiling force generated by the major winding. The wire 22 is made from a material which is capable of being formed into a fixed coil configuration but which will elastically deform in the presence of forces tending to uncoil the wire. In one embodiment of the invention, the wire 22 may be made of a super elastic or shape memory material, such as Nitinol. Other materials may also be suitable for use as the wire 22 in certain applications, including, e.g., plastic, spring steel, stainless steel, etc. In certain embodiments the wire 22 may comprise two or more lengths of wire which may be twisted or braided together.

Figure 3:
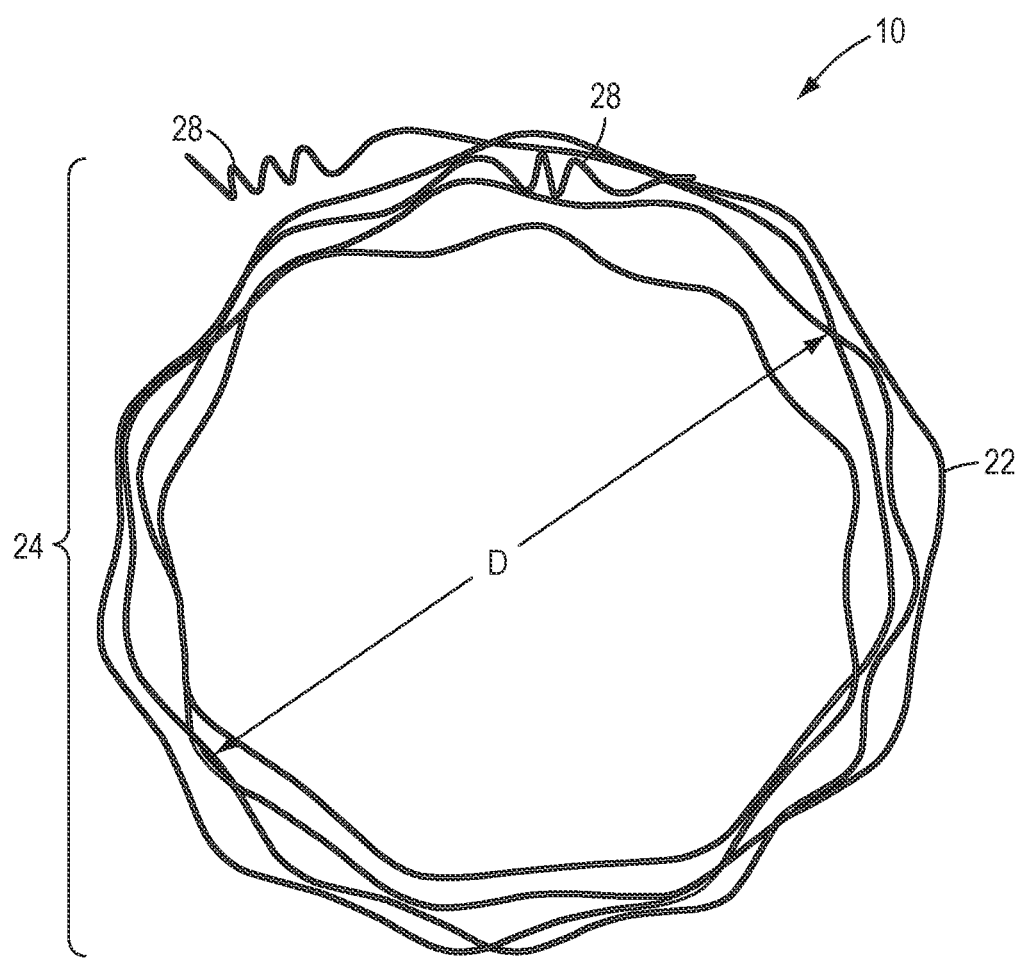
FIG. 3 is a top perspective view of the cable coiling device of FIG. 1 shown without the earphone cable and with the cable coiling device in the fully coiled state.
Figure 4:
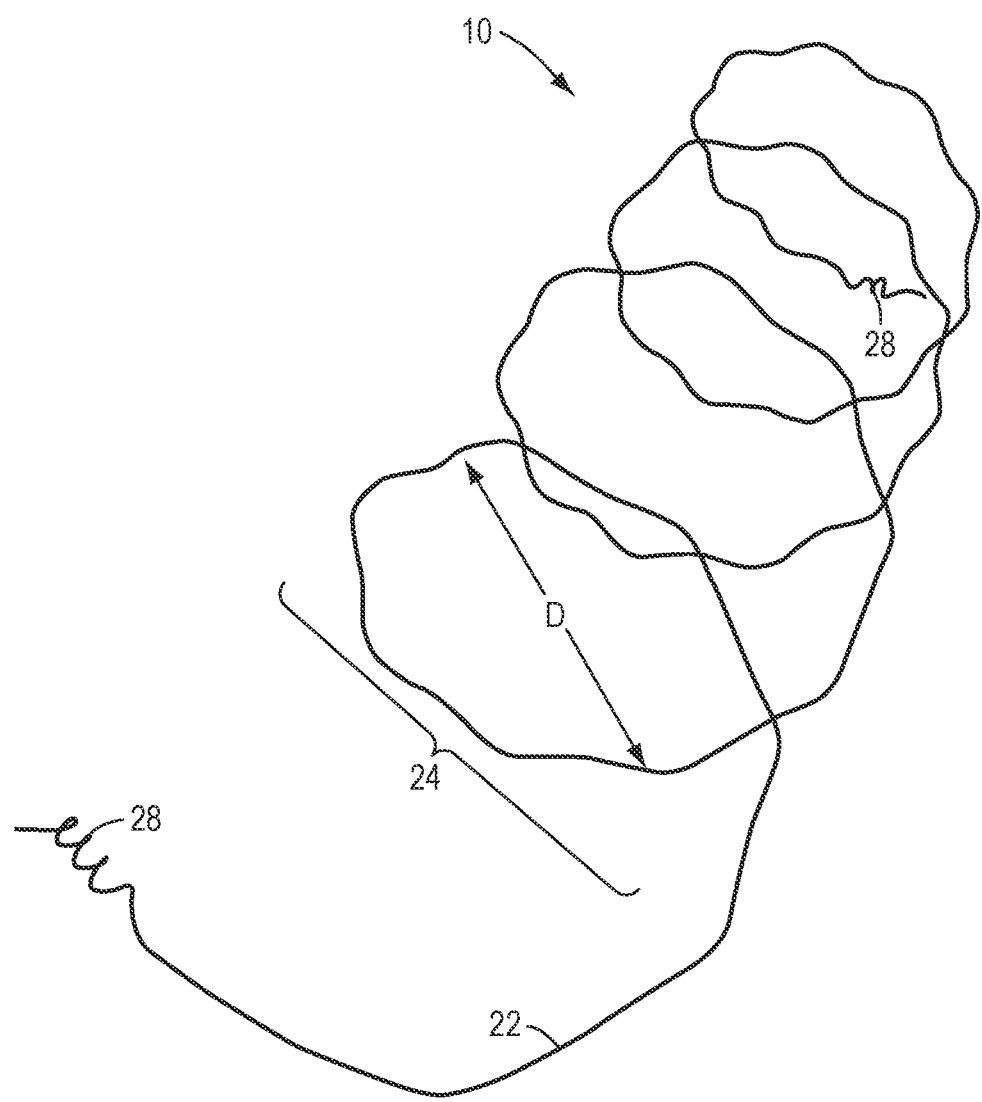
FIG. 4 is a side perspective view of the cable coiling device of FIG. 3 shown in the partially uncoiled state.
Figure 5:
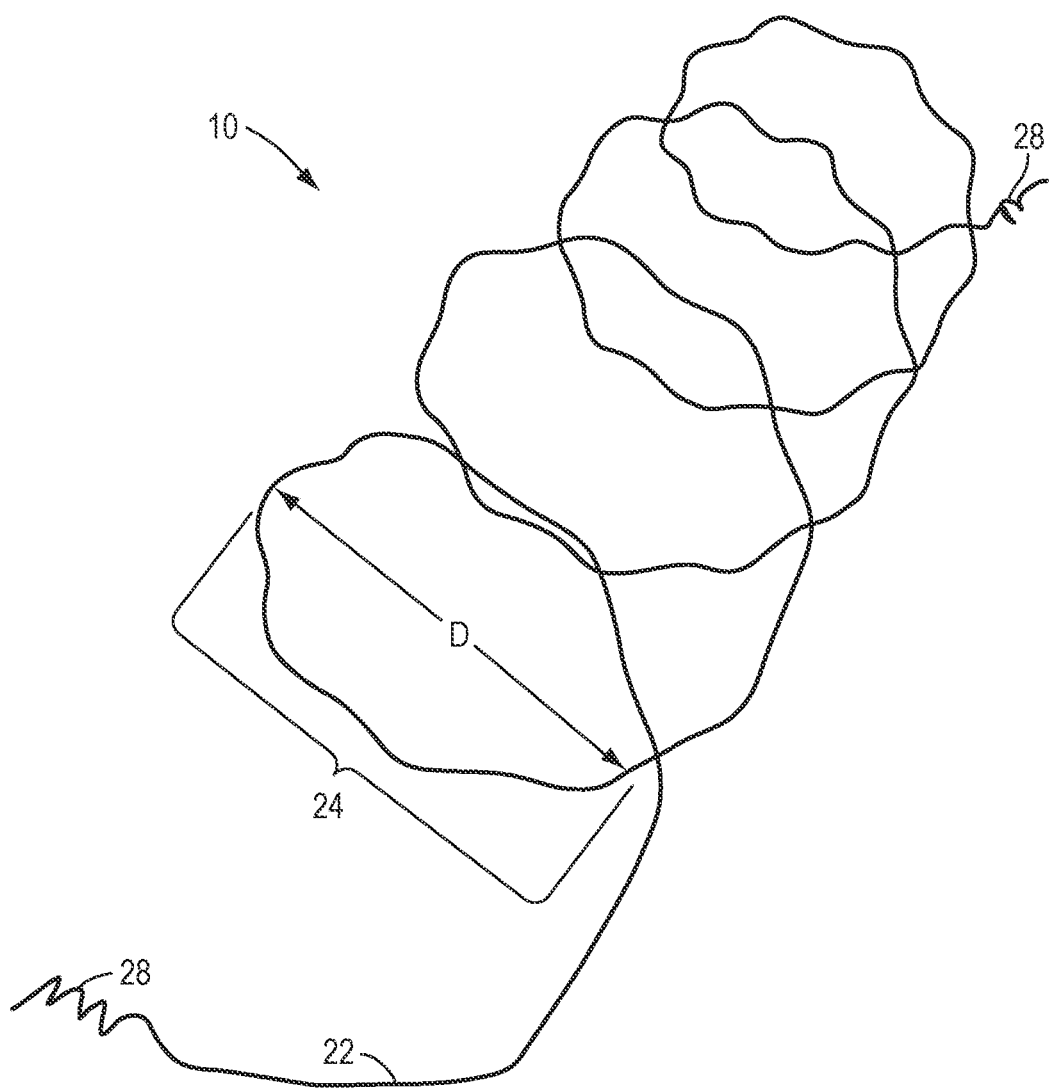
FIG. 5 is a top perspective view of the cable coiling device of FIG. 3 shown in the partially uncoiled state.

The major winding 24 can be pre-coiled into any configuration which one desires the cable 12 to assume. As shown in FIGS. 2 and 3, for example, the major winding 24 is configured as a circular coil having a major diameter D. In other embodiments of the coiling device 10, the major winding 24 may be configured as a spiral coil, a square coil, a triangular coil or any other desired shape. Moreover, the major winding 24 may not be a "winding" at all but may instead be formed into a fanfold or concertina shape.

Figure 8:
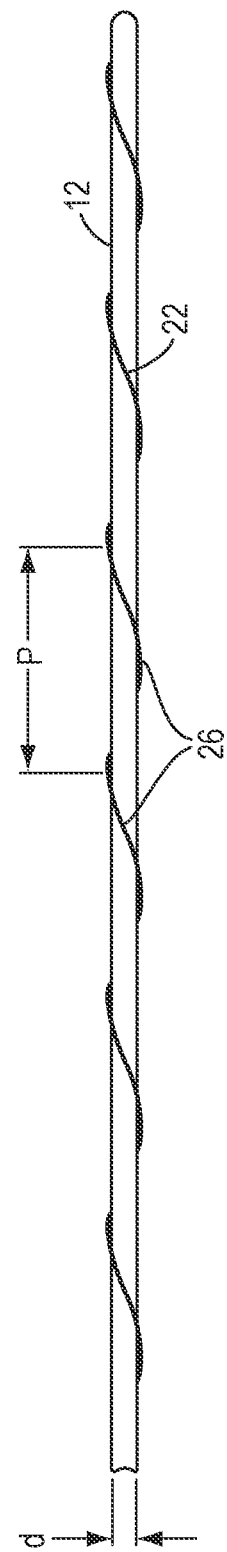
FIG. 8 is a view of a portion of the cable coiling device of FIG. 1 shown in a fully uncoiled state.

The minor winding 26 is configured to conform to the cross section of the cable 12. Referring to FIG. 8, for example, in the case of a cable 12 having a circular cross section, the minor winding 26 is wound in a circle having a diameter d that is the same as or slightly smaller than the cross sectional diameter of the cable in order to firmly attach the coiling device 10 to the cable. Also, the minor winding 24 is formed with a pitch P that is sufficient to ensure that the cable 12 does not sag or kink. In this manner, the minor winding 26 will transmit the coiling force generated by the major winding 24 to the cable 12. The minor winding 26 may also comprise end effects for securing the ends of the wire 22 to the cable. As shown in the drawings, for example, the minor winding 26 is formed with a section 28 of increased pitch at each end of the wire 22.

Figure 6:
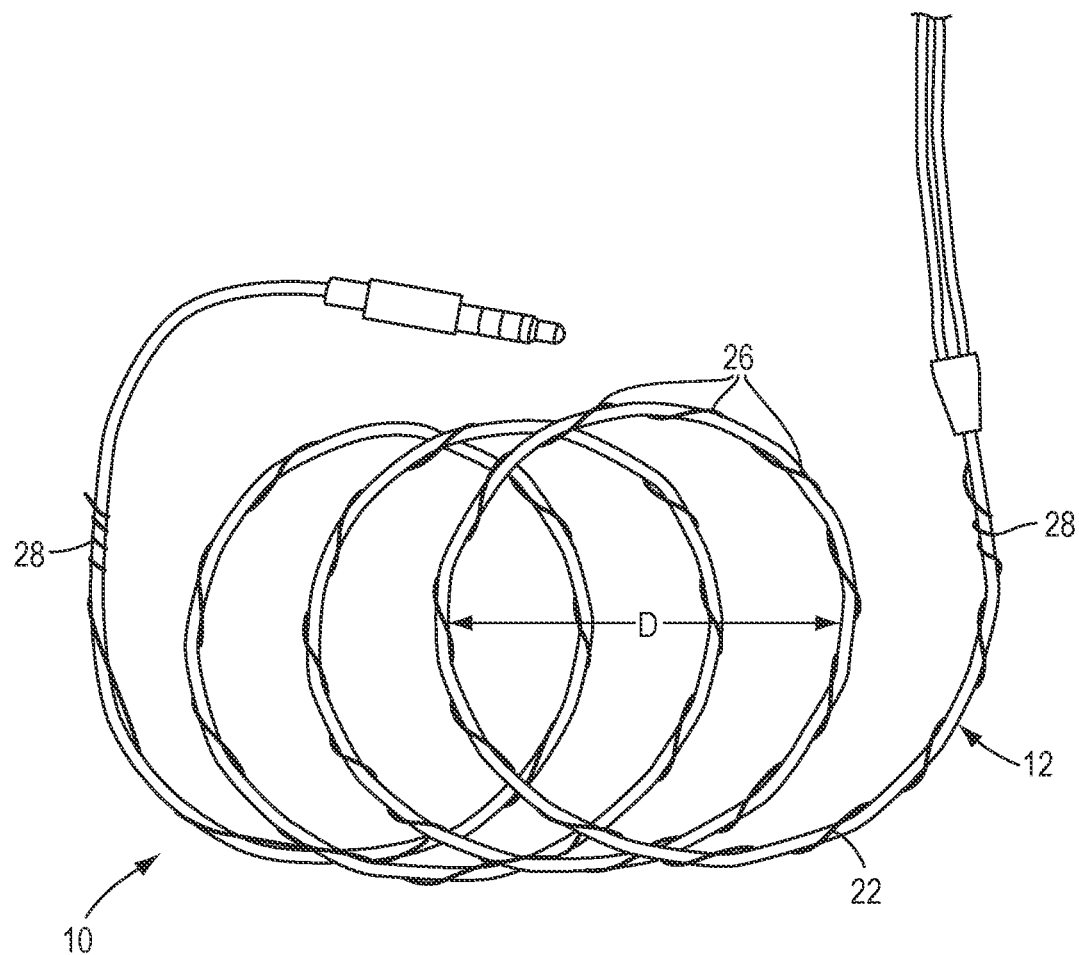
FIG. 6 is a view of the cable coiling device of FIG. 1 shown in a slightly uncoiled state.
Figure 7:
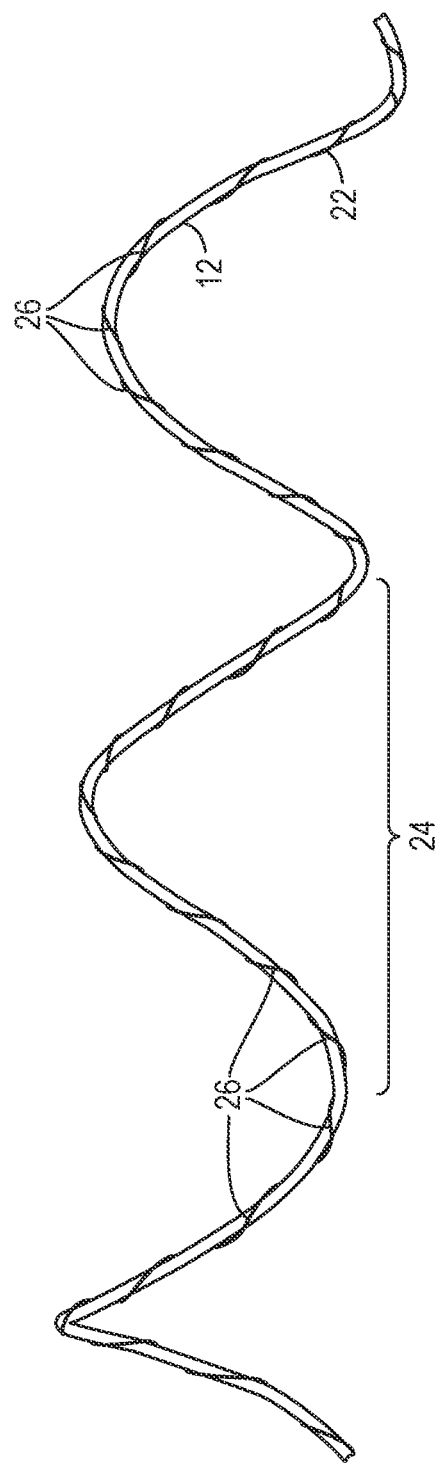
FIG. 7 is a view of a portion of the cable coiling device of FIG. 1 shown in a more fully uncoiled state than is shown in FIG. 6.

After the coiling device 10 is formed, it may be attached to the cable 12 by simply winding the minor winding 26 around the cable for the full length of the wire 22. Once so attached, the spring force inherent in the major winding 24 will act to automatically coil the cable 12 into the desired configuration, such as the circular configuration shown in FIG. 2. Then, by applying a predetermined force between the ends of the cable 12, the major winding 24, and thus the cable 12, will begin to uncoil, as shown in FIGS. 6 and 7. In certain applications, such as the earphone cable 12 shown in the drawings, the material and diameter of the wire 22 are ideally selected to impart only a minimal restoring force to the major winding 24. In this manner, the cable 12 will remain substantially fully extended without the major winding 24 generating annoying pulling forces on the ends of the cable, such as pulling forces which would tend to pull the earphones 20 out of the user's ears.

As an alternative to the minor winding 26, other means may be employed to attach the wire 22 to the cable 12 and transfer the coiling force from the major winding 24 to the cable. For example, the coiling device may comprise a number of clips which connect the wire 22 to the cable 12 at intervals along the length of the cable. Alternatively, the coiling device may comprise a length of heat shrink tubing which is positioned around both the wire 22 and the cable 12 and then heat activated to secure these components together. In another alternative, a suitable tape may be spiral wound around both the wire 22 and the cable 12 to secure the wire to the cable. Also, instead of employing a minor winding 26 to wrap the wire 22 around the cable 12, the wire may be formed without the minor winding and the cable instead wrapped around a wire which is formed with only the major winding 24.

Figure 9:
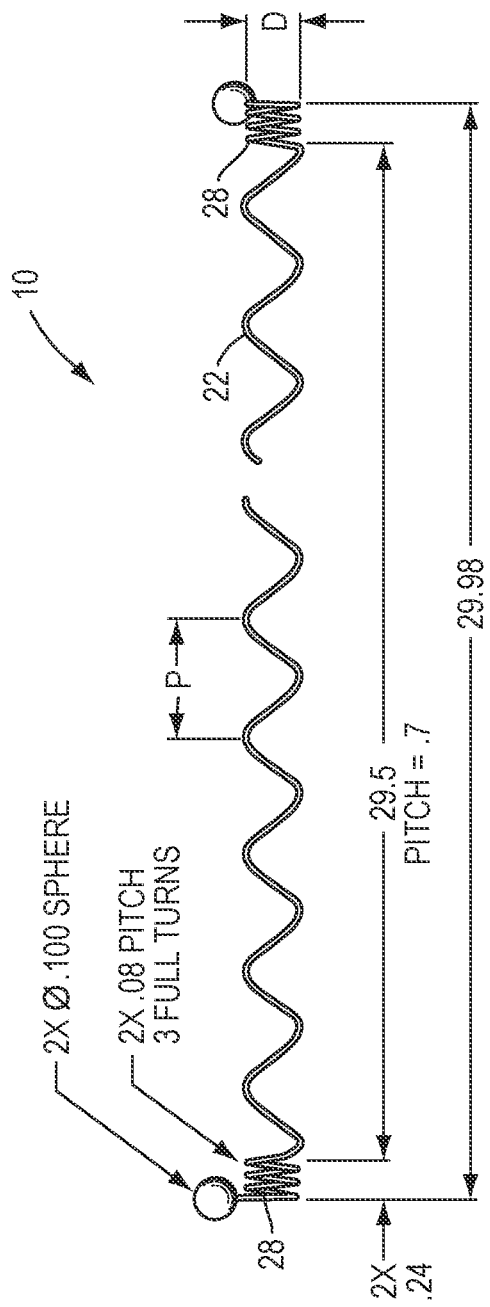
FIG. 9 is a front elevation view of another embodiment of the cable coiling device of the present invention but with the major diameter winding omitted from the device for clarity.
Figure 10:
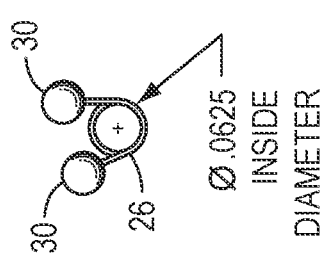
FIG. 10 is a side elevation view of the cable coiling device shown in FIG. 9.

Referring also to FIGS. 9 and 10, a particular construction of the illustrative embodiment of the coiling device 10 will now be described. In this embodiment the wire 22 of the coiling device 10 is made from 0.020" diameter Nitinol wire in the super elastic condition. The diameter D of the major winding 24 is 2.00" and the diameter d of the minor winding 26 is 0.080". The diameter of the wire 22 was empirically selected to provide a spring rate that will be strong enough to coil the cable 12 yet weak enough to allow the cable to be extended to substantially its originally manufactured length without pulling the earphones from the user's ears or generating more than an almost imperceptible force. The length of cable 12 to which the coiling device 10 is applied will not tangle or kink in normal use. If a loop in the cable 12 twists backwards, a simple pull on the ends of the cable will restore the coiling device 10 to its original configuration; no unknotting is required.

As shown in FIG. 9, the coiling device 10 has tighter windings 28 at the ends to keep the wire 22 from separating from the cable. The coiling device 10 may also have a ball 30, loop or similar end piece at each end to, for instance, keep the wire 22 from snagging or catching on the user's pocket. The end piece 30 may also aid in removing the coiling device 10 from the cable 12.

In one embodiment of the invention, the coiling device 10 is constructed of including Nitinol. Nitinol is a very robust material and is corrosion resistant. It may be coated or metal plated to provide the coiling device 10 with a different esthetic or to match the cable 12. Nitinol does not contain iron and is not magnetic. Consequently, the coiling device 10 will not interfere with the cable 12 or the device to which it is connected either electrically or magnetically.

The coiling device 10 may be formed by first winding the Nitinol wire 22 onto a first mandrel having a diameter corresponding to the diameter d of the minor winding 26. As a result, the minor winding 26 will have an axis which corresponds to the axis of the cable with which the coiling device is to be used. In this step, the wire 22 is wound to the specified pitch P (or pitches) for the desired overall length of the coiling device 10. The linear mandrel with the wire 22 coiled thereon is then wound onto a second mandrel having a diameter corresponding to the diameter D of the major winding 24 until the required number of turns for the major winding is obtained. The entire assembly is then heated to 500° C. for twenty minutes to heat set the geometry of the major and minor windings 24, 26. The end pieces 30 may then be soldered, welded, crimped, adhered, etc., onto the wire 22 if desired. Various types of coatings, platings, etc. may also be applied if desired.

The device, in all its possible configurations, can be made from many different types of materials, both organic and inorganic, depending on the application. Choices of materials may include metals; materials that exhibit super elastic characteristics, both metals (e.g. Nickel Titanium (NiTi) alloys) and non metals; plastics of all types of resins, both normal and high performance (Acetal, Ultem, ABS, PVC, Thermal Plastic Elastomers, etc.); composites; ceramics; and materials as diverse as bamboo.

Common plastics and organics are ideal for lower price point applications and applications of intermittent or nearly static service, such as where the device in use generates a specified force for a short time but otherwise relaxes and is in a steady state condition. Plastic devices are well suited where immediate recovery from loading is not necessary, for example where recovery time typically matches time under load in maximum use conditions. Example applications in the consumer electronics industry would include USB cables and power cables. In such applications, the cable undergoes very little rapid dynamic loading and unloading and very seldom is stretched to its maximum length. High performance plastics (e.g., Ultem, Peek) that closely match the mechanical characteristics of some metals, but at much lower operating temperatures, may also be suitable for certain applications.

To manufacture a plastic coiling device, the plastic may be extruded into filaments, mandrel wrapped and heat set; printed with a 3D printer; or molded in conventional plastic molding equipment. The possible stylistic variations utilizing 3D printing are large. It should be noted that metal devices can also be 3D printed in certain types of 3D printers. The cross section of the plastic coiling device can have a variety of configurations, such as round, square, rectangular, oval, etc. In addition, the major winding of the coiling device can have a number of configurations, from simple round or flat shaped to star shaped, heart shaped, etc. Moreover, the material may be thinned or thickened along the length of the coiling device in order to modify the flex modulus of the device. Also, names or other decorations can be molded into the material to provide further distinction and/or mechanical properties.

Plastics will allow a very large range of colors and can have many types of standard and specialized coatings. They also may be electro plated with all types of precious metals.

Plastics or composites are also useful in applications where non-electrical conductivity is an important consideration. Such materials are also useful in situations where strong magnetic fields are present, where ferrous metals cannot be tolerated due to electrical considerations, and/or where the material could distort the magnetic field, induce a current flow or otherwise be electrically disruptive.

Plastic coiling devices may have a larger diameter than metal due to the fact that the flex modulus of plastic is typically 30-100 times less than that of steel. As a result, plastics must be larger in diameter or cross sectional area to develop equivalent forces to those of metals. Some super plastics exist, e.g. PEEK and ULTEM, that are exceptions, as they compare more favorably to metals except for operating temperatures.

The coiling device may also be made of a hybrid or composite material, e.g., by molding a plastic over a metal core or a traditional plastic over a super plastic core. Various types of fibers (i.e., carbon fiber, glass fiber) can also be added to tailor the mechanical characteristics of the coiling device to a particular application, e.g., for stiffness or strength.

Substantial gripping action can be achieved by imparting a relatively large pitch to the minor winding 26, and such a pitch is sufficient to hold the coiling device in position in many applications. However, situations may exist where additional griping force might require the use of a smaller pitch (e.g., high dynamic situations).

As discussed above, the minor winding 26 may be formed with a section 28 of increased pitch at each end of the wire 22 in order to help secure the coiling device to the cable. These "locking windings" may be located at one or both ends of the coiling device. In addition, the coiling device may be configured with a number of smaller pitch sections located at intervals along its length. These smaller pitch sections can have several functions. For example, the smaller pitch sections can define cutting points that will enable a user to size the coiling device to his or her particular application. Such an arrangement would allow the coiling device to be shortened and still have locking windings at both ends. This would be ideal for, but not limited to, plastic devices, as they are relatively easy for a user to cut. For example, a long coiling devices having a number of minor locking windings along its length may be provided. In use, the user would "cut" the device at one of these smaller pitch sections in order to shorten the device to a specific length where a full amount of coiling is not required.

Locking windings can have a pitch which varies from approximately the diameter of the wire (i.e., each coil touching the next), to any size required for a particular application. For many applications, a pitch which is equal to or slightly less than the diameter of the cable will ensure that the coiling device will not unlock from the cable during use. In situations where it is absolutely critical that the coiling device does not separate from the cable in use, the locking windings can be closed (i.e., each coil touching the next). The cable can still be wrapped around the coiling device in the standard fashion; however, the locking windings may have to be bent back to facilitate the winding.

Although the above-described attachment method utilizing locking windings at each end of the coiling device is suitable for many applications, other attachment/locking devices or techniques may be employed to attach the coiling device to the cable. In addition, these other attachment/locking devices or techniques may be used in combination with the locking windings if additional holding force is required.

In an embodiment of the invention which will be described below, the coiling device is mounted inside a tubing to be coiled. In this embodiment, locking windings are not necessary. Instead, the minor winding may be designed to press against in the inner wall of the tubing in order to secure the coiling device to the tubing. Moreover, the minor winding will create an internal helical supporting structure for the tubing. Among other benefits, the internal supporting structure will allow for the use of a thinner walled tubing than otherwise may be appropriate for a particular tubing application, which will result in a lighter, less expensive and more flexible tube. Materials such as Nitinol alloys are especially suitable for these applications because, unlike some non super elastic materials, they allow the tube to be stretched to its complete design length while still being able to coil the tube.

Figure 11:
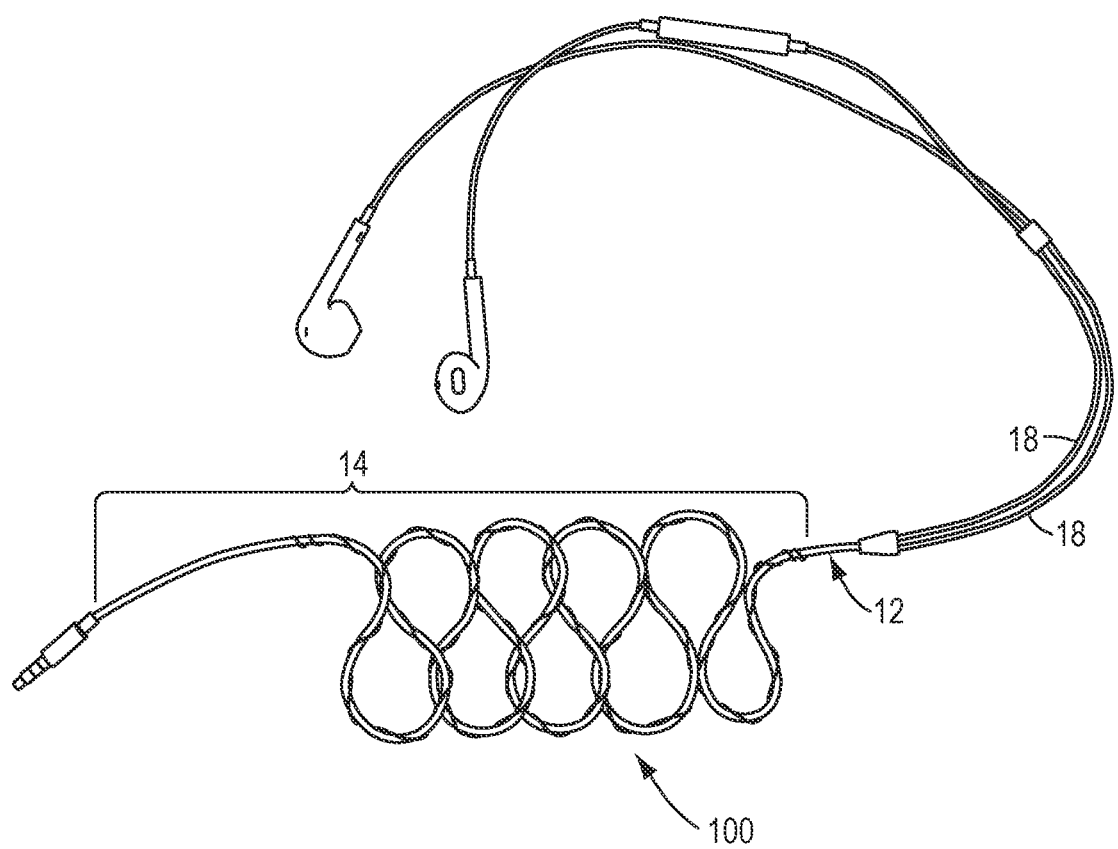
FIGS. 11-27 are views of additional embodiments of the coiling device of the present invention.
Figure 12:
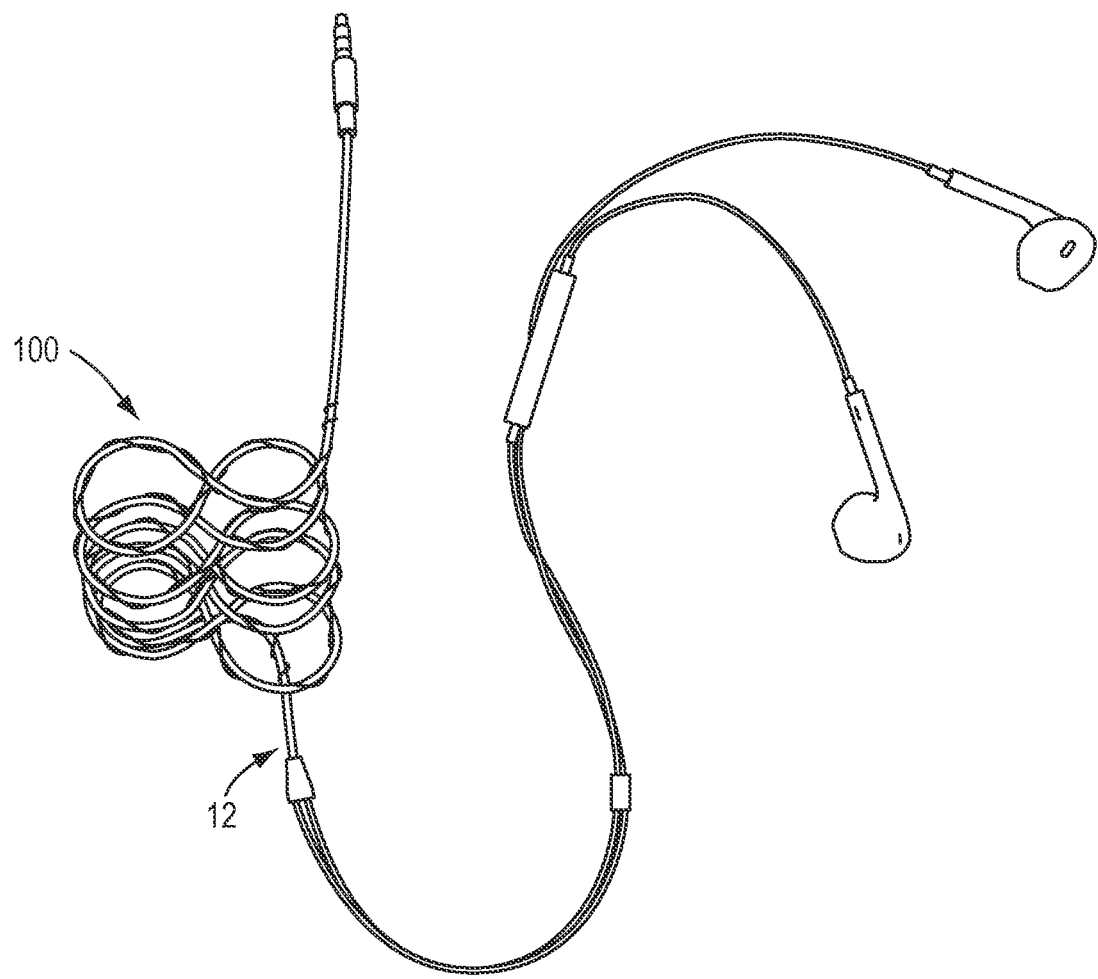
Figure 13:
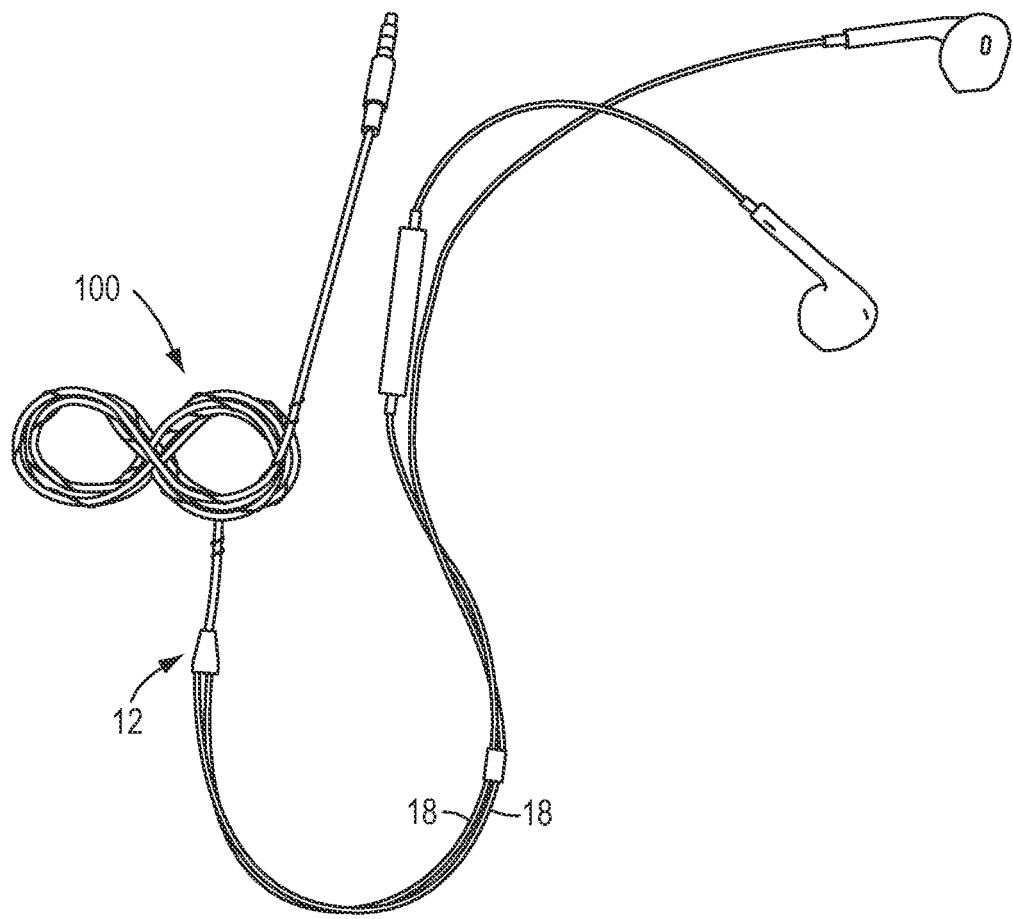

Another embodiment of the coiling device of the present invention is shown in FIGS. 11-14 in conjunction with an exemplary ear phone cable 12. The coiling device of this embodiment, generally 100, comprises a major winding 24 having the general shape of an infinity sign (FIG. 11). A notable attribute of this design is that it is extremely resistant to knotting. This is especially true when the coiling device 100 is constructed of a super elastic material that allows complete straightening of the cable to which it is attached.

Figure 14:
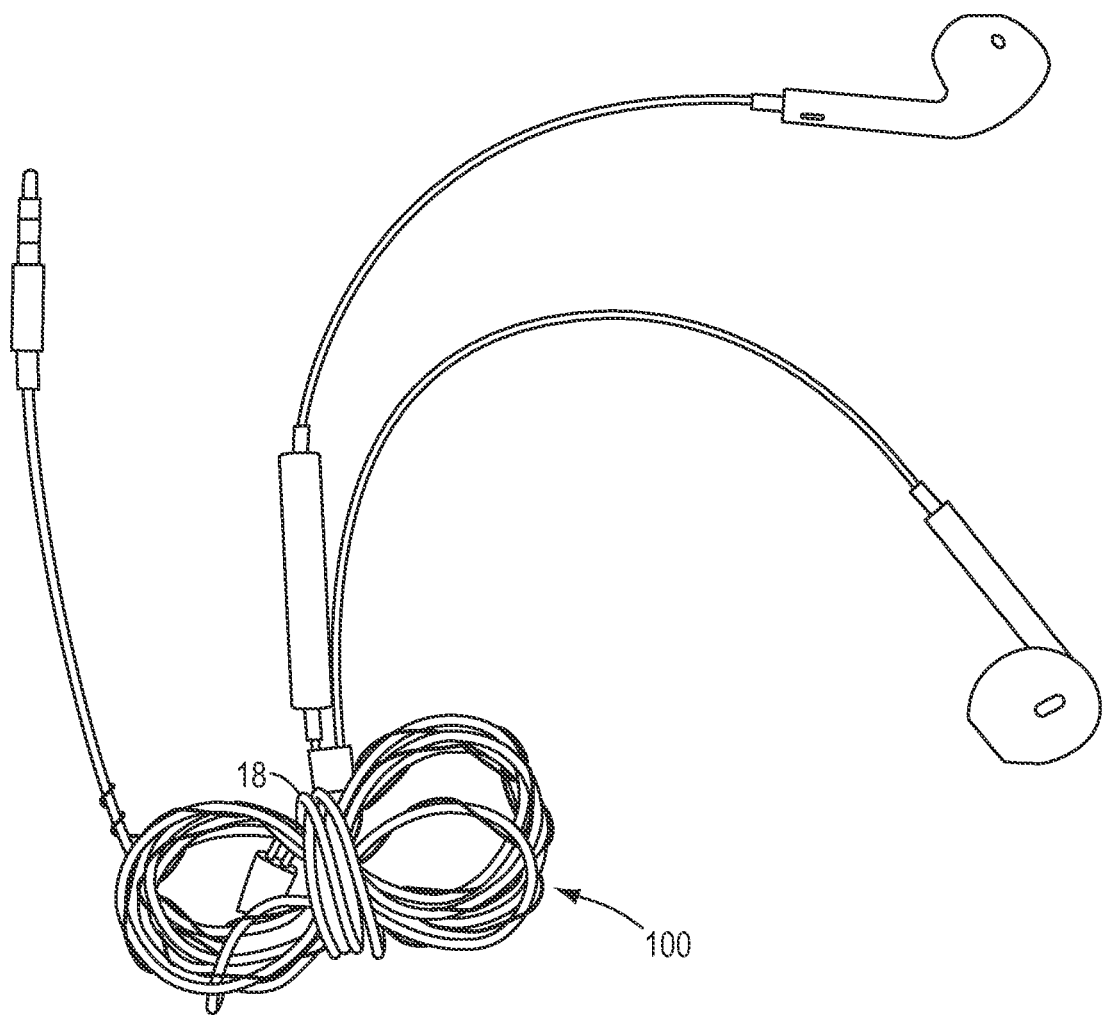

An additional feature of the infinity sign-shaped coiling device 100 is that it can be formed in a number of ways to assist in creating a configuration that is useful for storage. As shown in the figures, for example, the coiling device 100 may be configured to attach to only the main section 14 of the cable 12. Then, after the main section 14 is "wound" (FIGS. 12-13), the branch sections 18 can be wound around the center of the infinity sign-shaped "bundle" to lock the whole assembly together for storage (FIG. 14).

Figure 15:
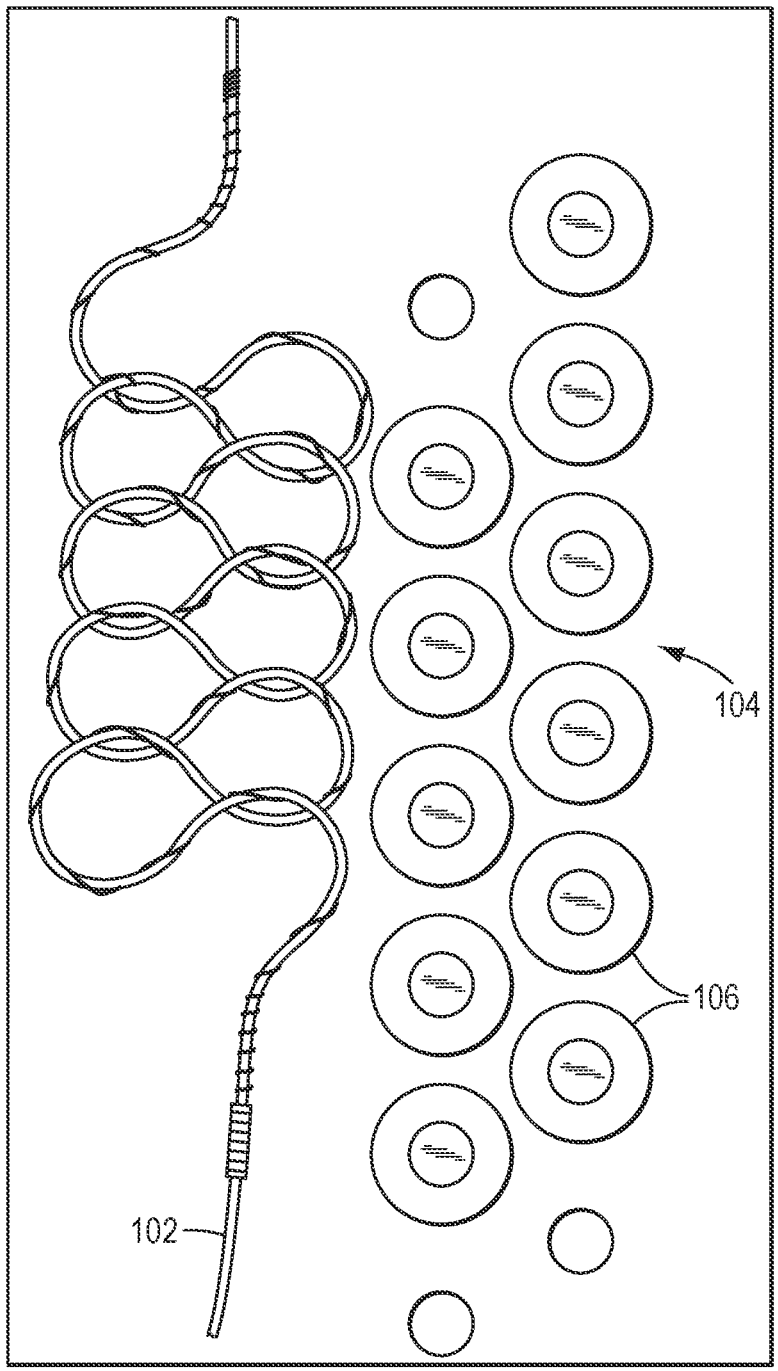

The infinity sign-shaped coiling device 100 can be made in a number of ways. As shown in FIG. 15, one method involves winding the wire of the coiling device 100 on an initially straight first mandrel 102 having the same diameter as the minor winding 26. In the embodiment shown in FIG. 15, the first mandrel 102 is made of solid copper wire having a circular cross section. In certain other embodiments, the first mandrel 102 may have a flat, oval or any other desired cross section. The first mandrel 102 with the wire wound thereon is then wound onto a second mandrel 104 to form the major diameter 24 of the infinity sign-shaped coiling device 100.

In FIG. 15 the second mandrel 104 is shown to comprise a series of staggered holding rings 106 around which the first mandrel 102 is wound. Alternatively, the mandrel 104 may comprise two adjacent vertical forms (such as two adjacent holding rings 106) having the desired end shape of the major winding 24. Such a mandrel 104 will yield the most compact infinity sign configuration and will allow the center of the configuration to be used for winding excess cable in order to lock the entire unit together for storage, which further enhances the "no tangle" capability of the coiling device 100. This configuration, like all other configurations, can be formed and heat set simultaneously.

In general, the second mandrel may comprise a form or series of forms which is capable of defining the desired finish geometry of the major winding but is also able to tolerate the final setting temperature of the material of the coiling device. Alternatively, the wire can be formed on a forming mandrel which is not subject to the setting temperature, and then placed into a separate clamping device to hold the shape at key strategic points so that it will not move under subsequent heating or setting.

Although the coiling device of the present invention has been described as being used primarily for existing cables and the like, it may also be manufactured into the cable. This alternative requires the use of a super elastic wire that has been "pre-formed" into the desired major winding before being embedded into a cable as the cable is being manufactured. This is possible because the pre-formed super elastic wire can be pulled completely straight so that it can be used in the cable manufacturing process. Once the cable has been manufactured and the tension holding the cable straight has been relieved, the cable will assume the configuration of the major winding which has been imparted in the wire of the coiling device.

Other methods for manufacturing the coiling device will now be described. For coiling devices made from super elastic materials such as Nitinol, the coiling device can be formed, held and then heat set or formed and heat set simultaneously on a standard wire forming machine which has heat setting and quenching capabilities designed into the tooling. For this method, the coiling device can be broken down into finite bending points along its length. In this scenario, instead of the coiling device being a smooth continuous piece, it is formed from small straight segments (similar to cord segments of a curve) which define bending positions. These positions are defined by spherical coordinates, and the number of points is determined by the size and shape of the device and the application and manufacturing speed requirements. Manufacturing speed is impacted due to the finite time it takes to make the bend. For example, on the earphone cable 12 depicted in the drawings, the point count can be reduced to help speed manufacturing.

Figure 16:
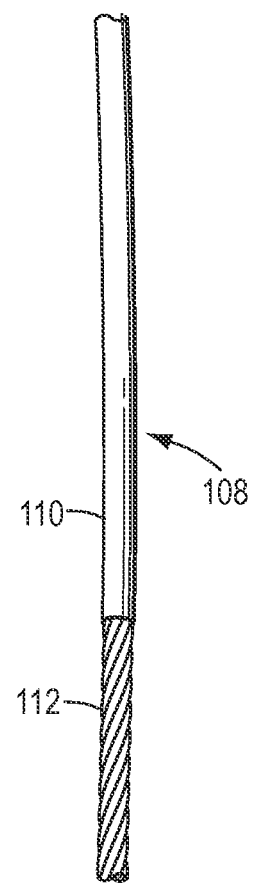

Another manufacturing method involves forming and heat setting the coiling device in a continuous process. This process may use a continuous mandrel, such as the mandrel 108 shown in FIG. 16. The mandrel 108 is comprised of copper tubing 110 in which a snug fitting stainless steel cable 112 is inserted. Both materials can withstand the setting heat and are flexible enough to be wrapped and bent into the desired major winding configuration.

In another embodiment of the invention, the coiling device comprises a minor winding, such as locking windings and holding windings, to secure it to the cable, but does not comprise a major winding. Consequently, the coiling device is straight in its relaxed state. As a result, the coiling device of this embodiment will tend to maintain the cable to which it is applied straight in order to prevent the cable from tangling or knotting.

It should be noted that the coiling device does not require locking windings to secure the coiling device to the cable. In certain applications, by making the pitch of the minor winding sufficiently small, the coiling device will remain secured to the cable during use. For example, in one embodiment the minor winding is configured such that the spacing between adjacent windings is less than or equal to the diameter of the cable on which the coiling device is used.

Additional embodiments of the coiling device of the present invention are shown in FIGS. 17-26.

Figure 17:
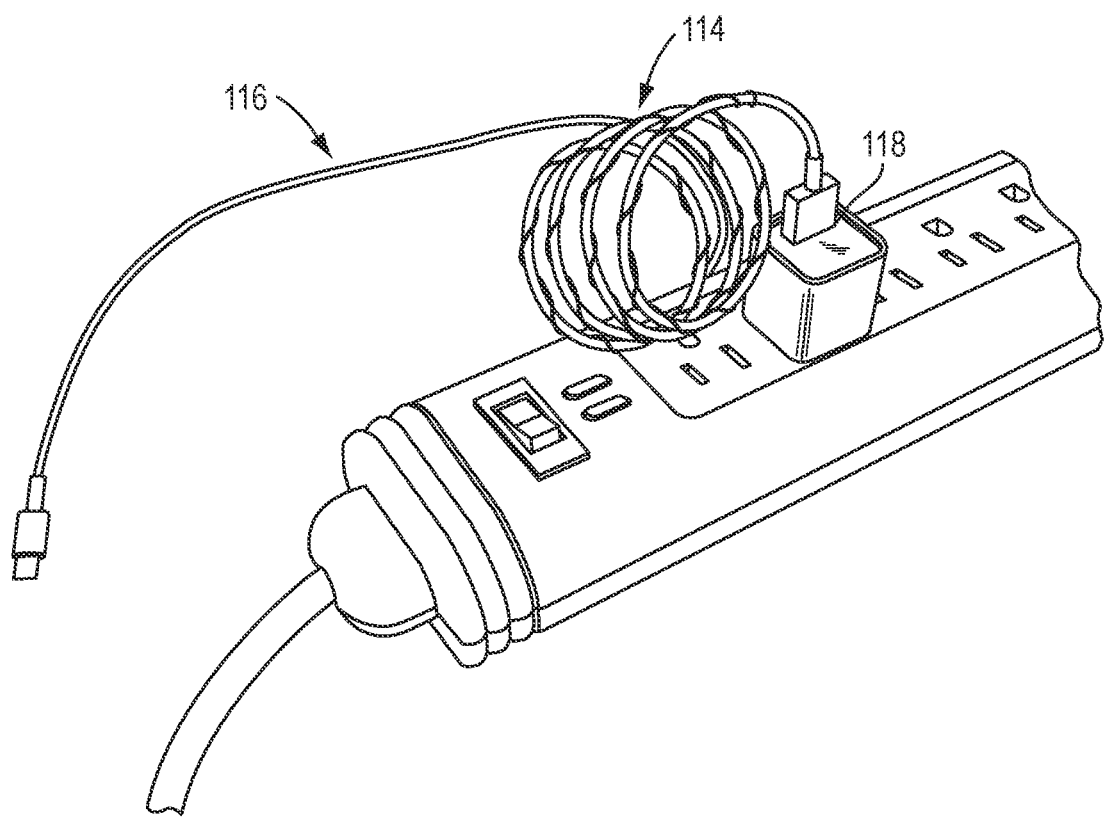

FIG. 17 is a perspective view of a coiling device 114 attached to a USB cable 116 of a conventional phone charger. In this embodiment, the coiling device 114 does not extend for the entire length of the cable 116. Rather, the coiling device 114 is designed to be applied to only the first approximately two-thirds of the cable 116 closest to the electrical outlet 118.

Figure 18:
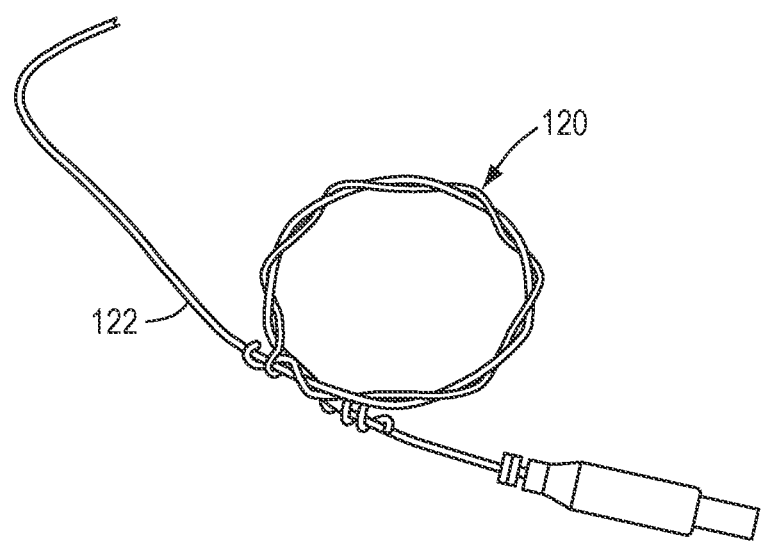

FIG. 18 is a perspective view of a coiling device 120 which is attached to a charging cable 122. In this embodiment, the coiling device 120 is made of a plastic material and comprises a single coil.

Figure 19:
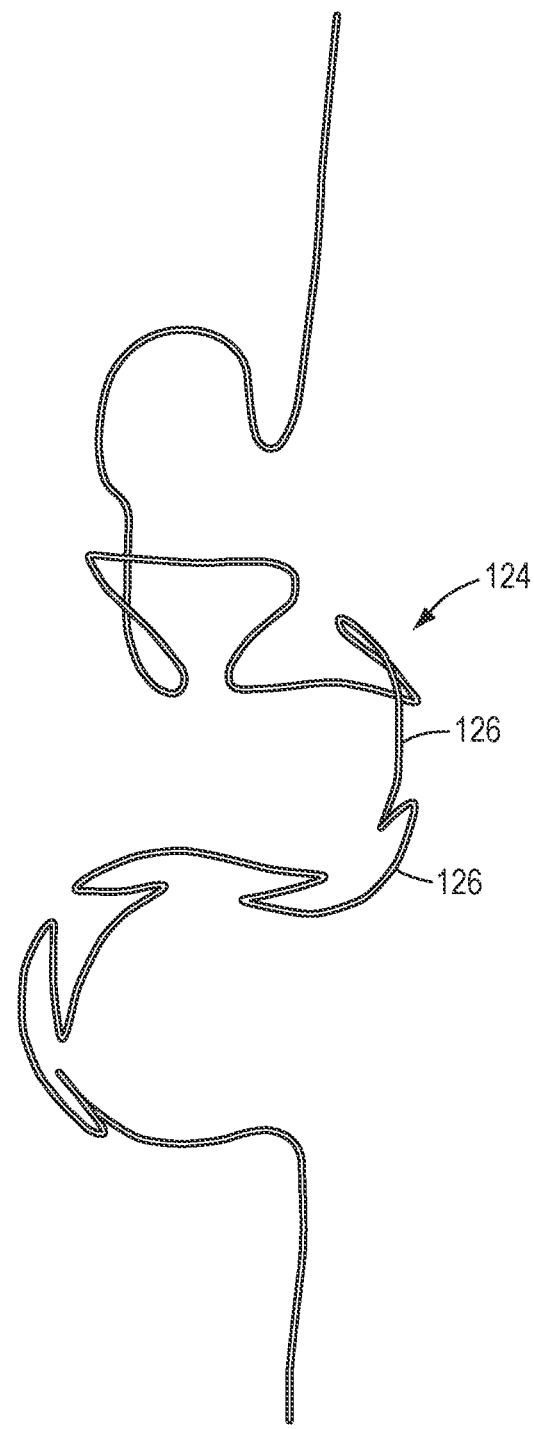

FIG. 19 is a top perspective view of an embodiment of a coiling device 124 in which the major winding 24 comprises a number of S-shaped windings 126 that extend in two planes. This design is particularly useful in reducing tangling of the cable or the like to which it is connected.

Figure 20:
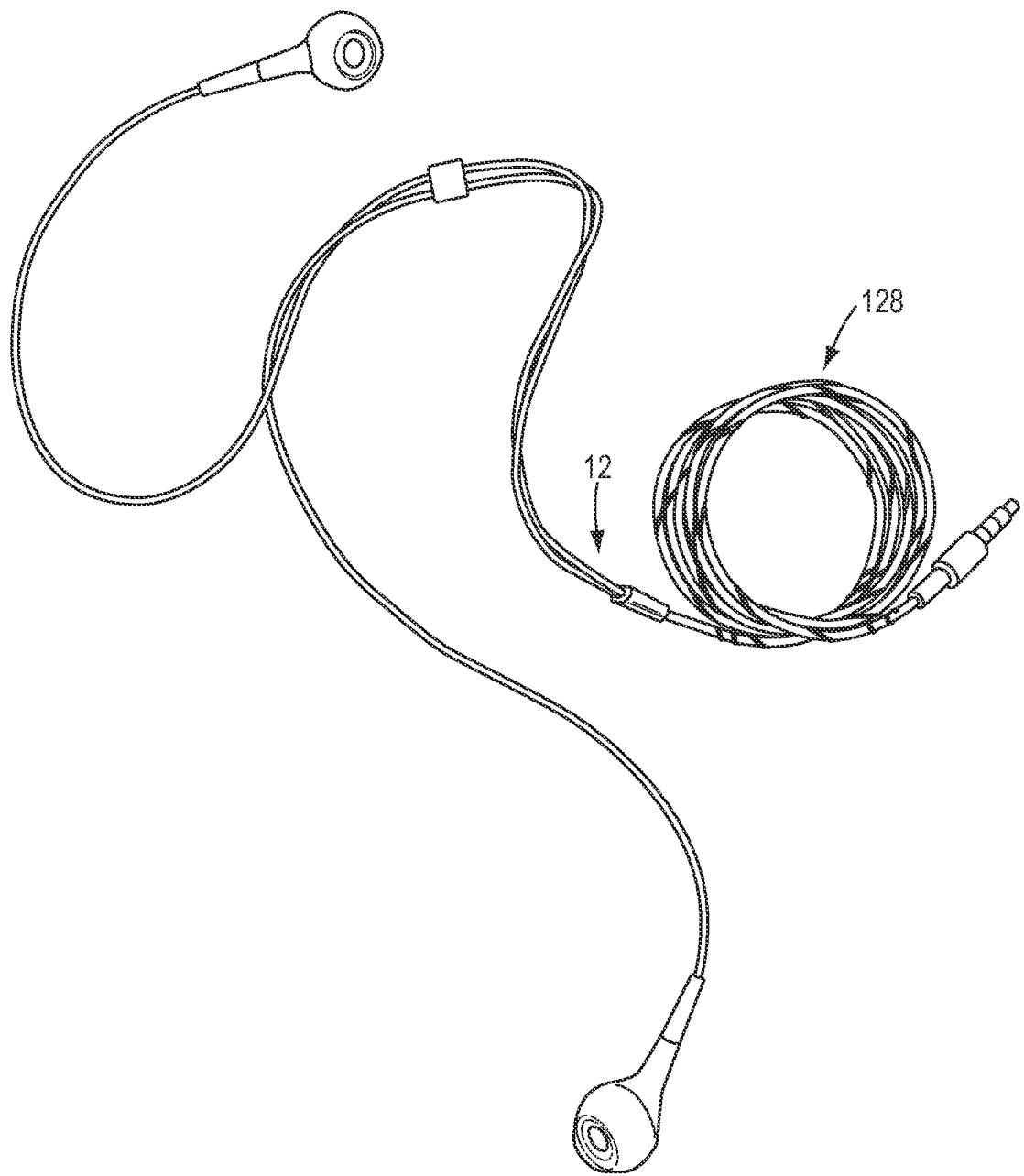

FIG. 20 is a perspective view of an embodiment of a "double wound" coiling device 128 attached to an exemplary earphone cable 12. In this embodiment, two coiling devices similar to the coiling device 10 described above are formed together as a single device. This design provides a higher spring rate without a corresponding increase in the profile of the device.

Figure 21:
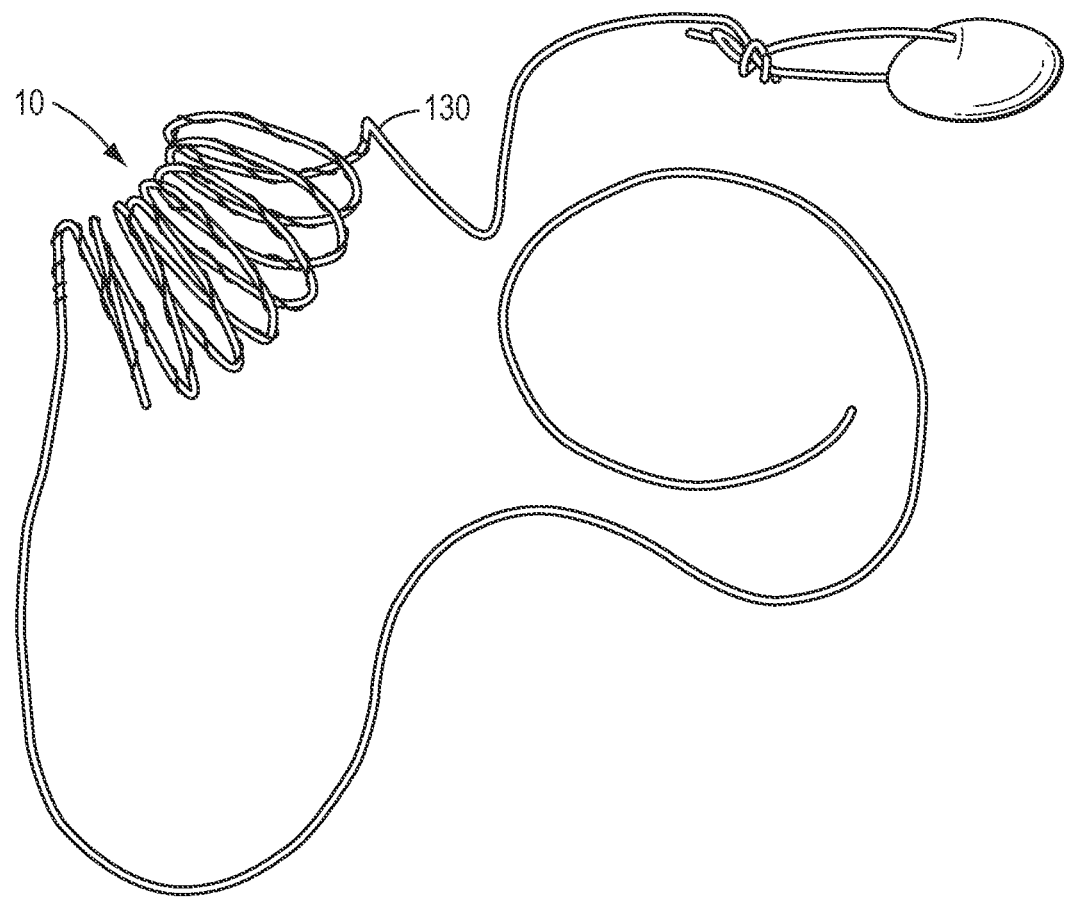

FIG. 21 is a perspective view of a coiling device, similar to the coiling device 10 described above, which is attached to the cable 130 of a duck decoy (not shown). In addition to maintaining the cable 130 compact and tangle-free during storage, the spring force imparted by the coiling device adds random motion to the duck decoy during use.

Figure 22:
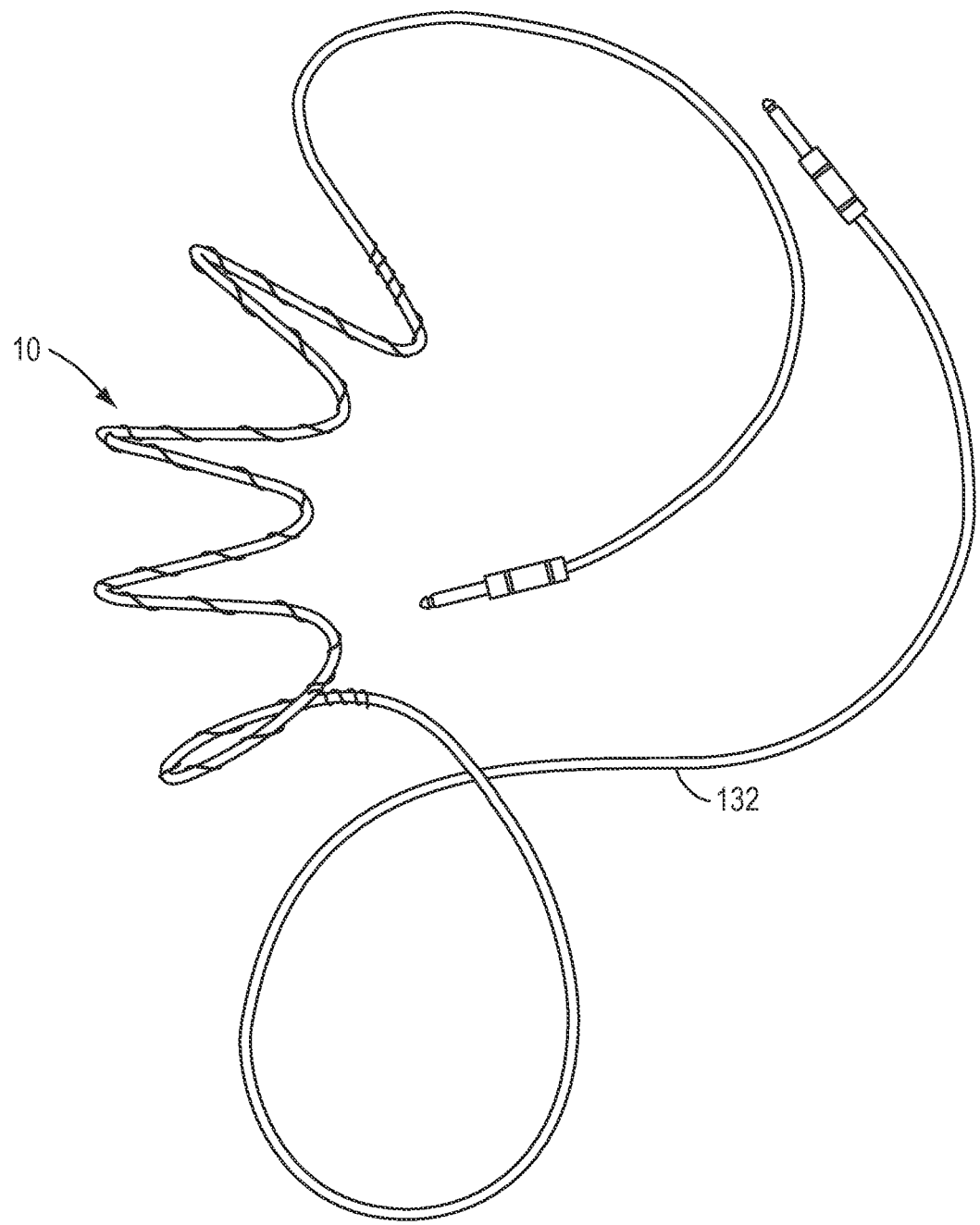

FIG. 22 is a perspective view of a coiling device, similar to the coiling device 10 described above, which is attached to a standard electric guitar cord 132. The coiling device of this embodiment is configured to not only exert minimum force when unwound so as not to impede the guitarist, but also to readily coil the cord 132 when not in use.

Figure 23:
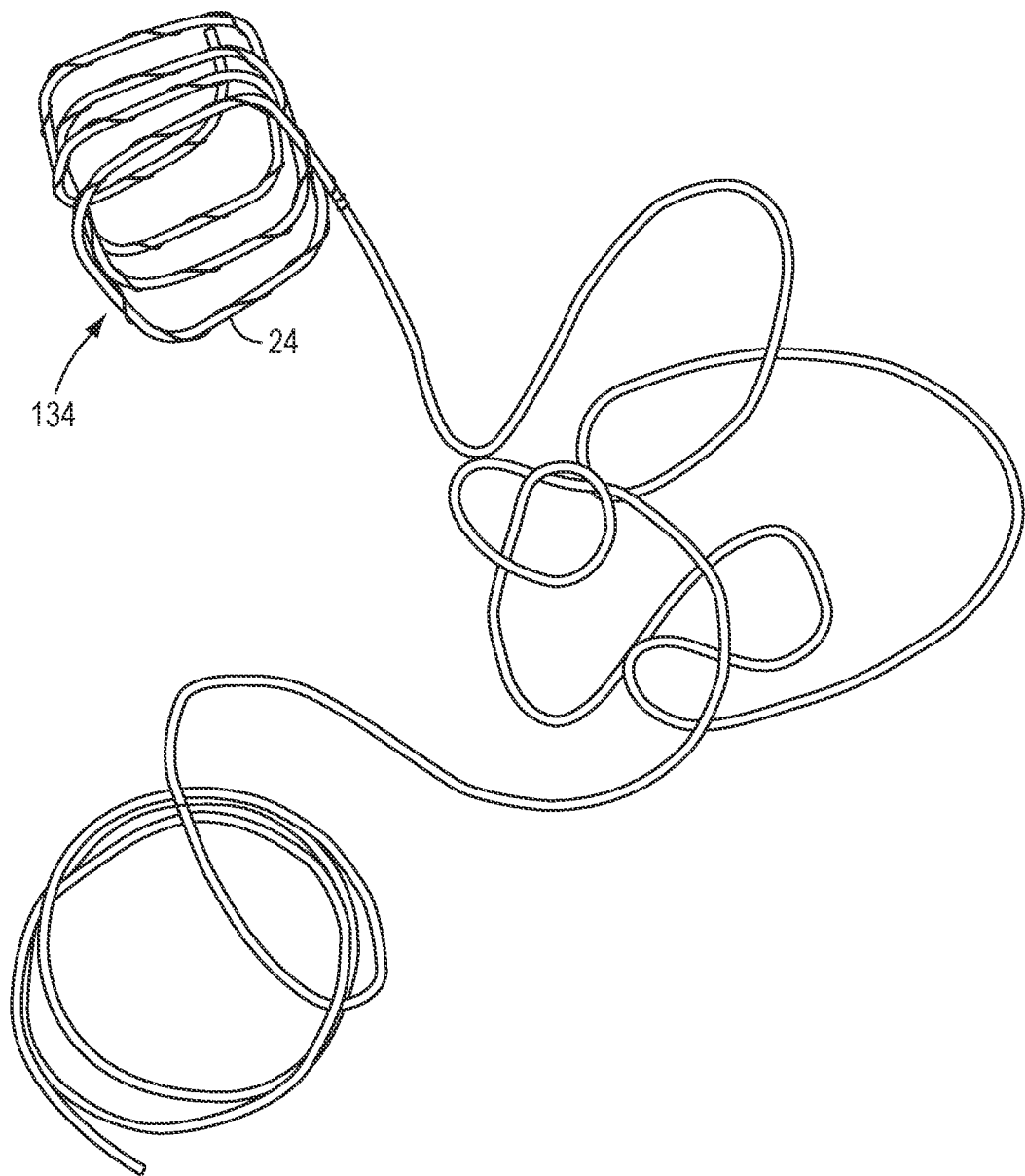

FIG. 23 is a perspective view of an embodiment of a coiling device 134 which comprises a major winding 24 that is configured generally as a square.

Figure 24:
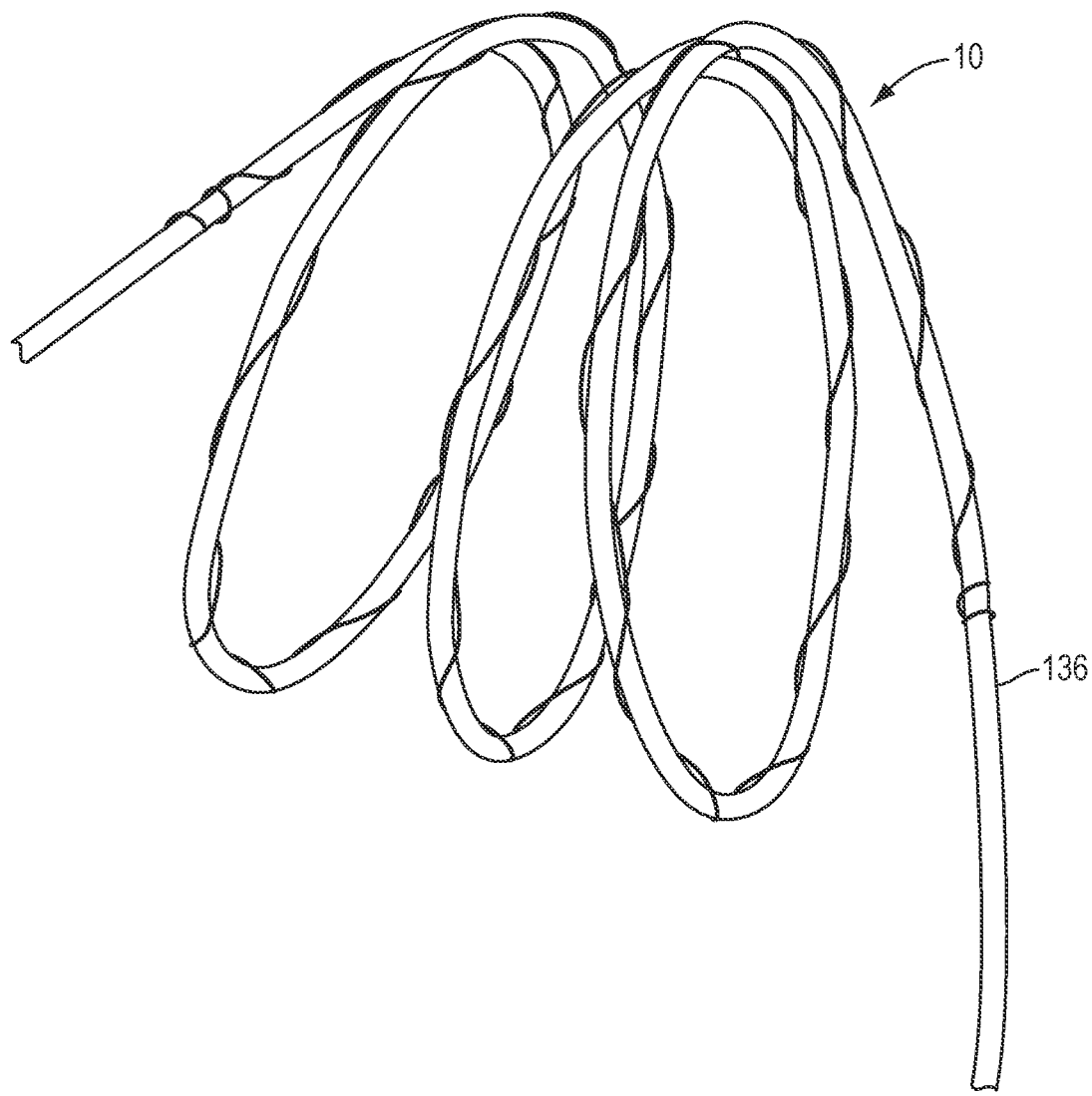

FIG. 24 is a top perspective view of a coiling device, similar to the coiling device 10 described above, which is attached to a length of plastic tubing 136.

Figure 25:
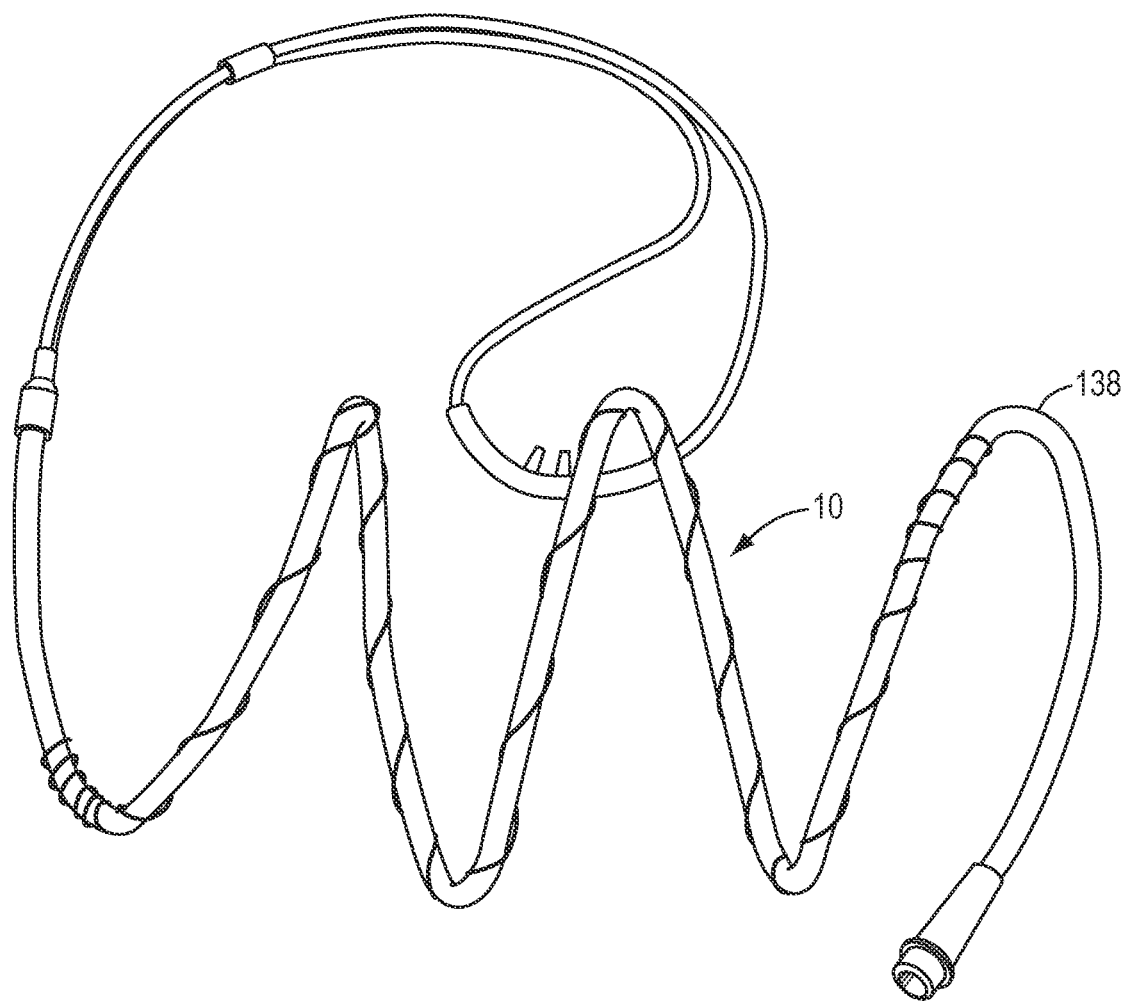

FIG. 25 is a top perspective view of a coiling device, similar to the coiling device 10 described above, which is attached to an oxygen tube 138.

Figure 26:
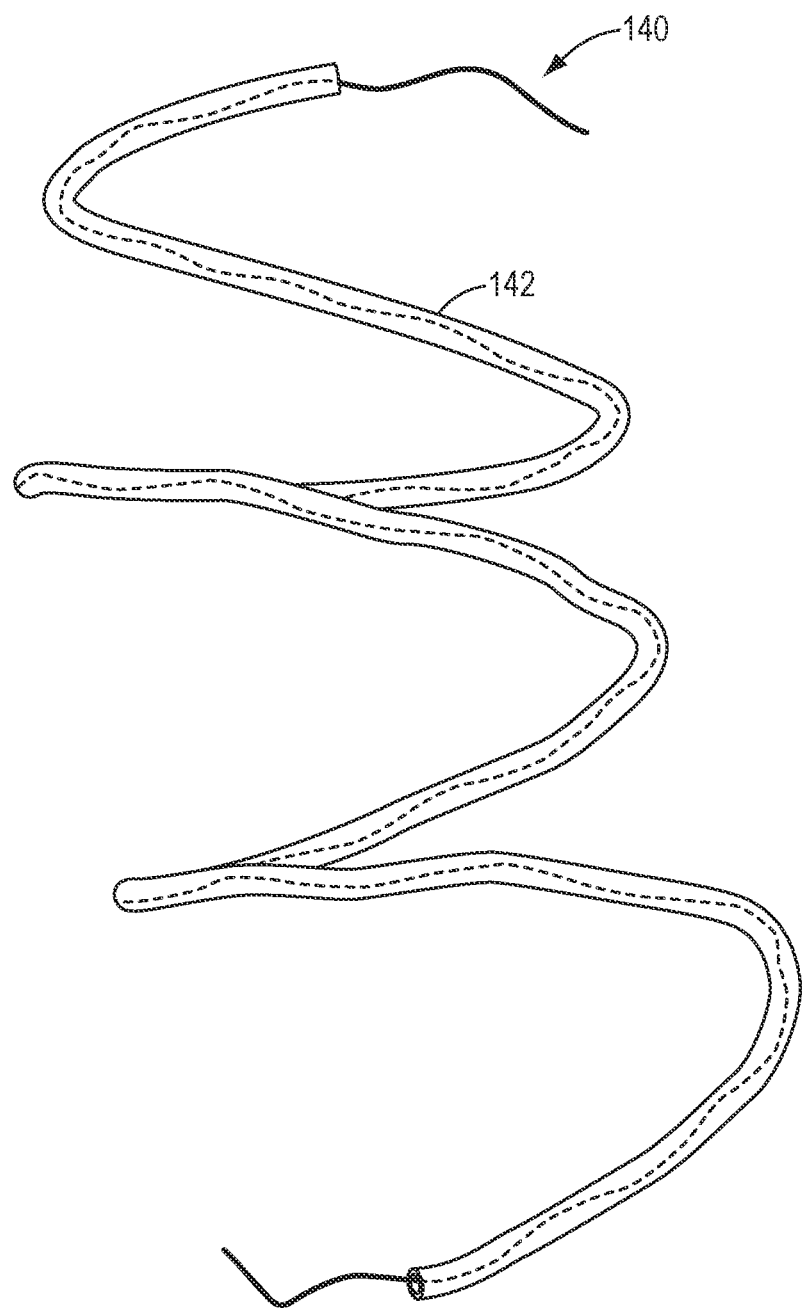

FIG. 26 is a top perspective view of an embodiment of a coiling device 140 which is configured to be positioned inside a tube 142. In this embodiment, the diameter of the minor winding is designed to be the same as or slightly smaller than the inner diameter of the tube 142 so as to firmly secure the coiling device 140 inside the tube. Also, the pitch of the minor winding may be varied depending on the application in which the coiling device 140 is used. For example, in relatively rigid tubes, the pitch of the minor winding may be relatively large. However, in tubes made of a relatively flexible or soft material, the pitch of the minor winding may be designed to be relatively small so as to provide the tube with internal support, which is important in preventing the tube from collapsing in certain applications. Although not shown, the ends of the coiling device 140 can be configured to attach to the corresponding ends of the tube 142 in order to secure the coiling device in the tube.

Figure 27:
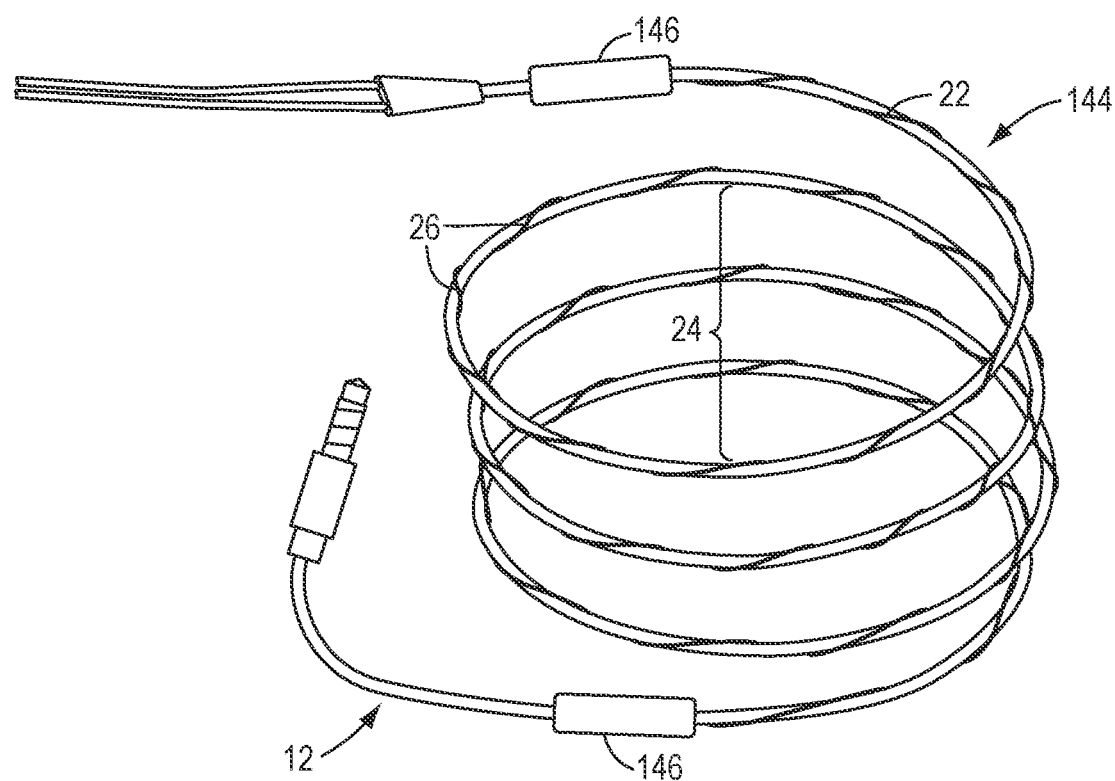

A further embodiment of the coiling device of the present invention is shown in FIG. 27. In this embodiment, the coiling device, generally 144, is shown attached to an exemplary earphone cable 12. The coiling device 144 is similar to the coiling device 10 described above in that it comprises a length of wire 22 which is formed with two windings: a major winding 24 which serves to coil the cable 12 into a desired configuration, and a minor winding 26 which functions to secure the wire to the cable 12. In addition, the coiling device 144 comprises a pair of clips 146 for securing the ends of the wire 22 to the cable 12. The clips 146 may be made of, e.g., plastic and molded in two halves, each of which comprises an axially extending, semi-cylindrical channel that, when the two halves are clipped or otherwise secured together, align to form a cylinder within which the cable 12 and the corresponding end of the wire 22 are snugly secured. Alternatively, each end of the wire 22 may be embedded by suitable means into a corresponding clip 146 which is formed in two halves that each comprise an axially extending, semi-cylindrical channel which, when the two halves are clipped or otherwise secured together, align to form a cylinder within which the cable 12 is snugly secured.

It should be recognized that, while the present invention has been described in relation to the preferred embodiments thereof, those skilled in the art may develop a wide variation of structural and operational details without departing from the principles of the invention. For example various features of the different embodiments may be combined in a manner not described herein. Therefore, the appended claims are to be construed to cover all equivalents falling within the true scope and spirit of the invention.

What is claimed is:

1. A method for making a device for coiling an elongated flexible object into a predefined shape, the method comprising:
    winding a length of wire around an elongated first mandrel having a diameter approximately the same as a diameter of the object;
    winding the first mandrel, with the wire wound thereon, around a second mandrel which is configured to conform to the predefined shape; and
    heating the first and second mandrels to set the windings.

2. The method of claim 1, wherein the wire comprises first and second end portions and a main portion extending between the first and second end portions, and wherein the step of winding the wire around the first mandrel comprises winding the main portion with a first pitch and winding the first and second end portions with a second pitch which is smaller than the first pitch.

3. The method of claim 2, wherein the step of winding the wire around the first mandrel comprises winding at least one section of the main portion with a third pitch which is smaller than the first pitch.

4. The method of claim 1, further comprising forming generally spherical first and second end pieces on the respective ends of the first and second end portions.

5. The method of claim 1, wherein the wire is made of a super elastic material.

6. The method of claim 1, wherein the wire is made of Nitinol.

* * * * *